US012014227B2

(12) United States Patent
Tanaka

(10) Patent No.: US 12,014,227 B2
(45) Date of Patent: Jun. 18, 2024

(54) PRINTING APPARATUS AND PRINTING METHOD

(71) Applicant: CANON KABUSHIKI KAISHA, Tokyo (JP)

(72) Inventor: Hirokazu Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/557,873

(22) Filed: Dec. 21, 2021

(65) Prior Publication Data

US 2022/0203728 A1    Jun. 30, 2022

(30) Foreign Application Priority Data

Dec. 25, 2020    (JP) ................................. 2020-217095

(51) Int. Cl.
*G06K 15/10*    (2006.01)
*B41J 19/14*    (2006.01)

(52) U.S. Cl.
CPC .......... *G06K 15/107* (2013.01); *B41J 19/142* (2013.01)

(58) Field of Classification Search
CPC ........................ G06K 15/105; G06K 15/107
See application file for complete search history.

(56) References Cited

U.S. PATENT DOCUMENTS 9,108,446 B2      8/2015   Nishioka et al.
2012/0287203 A1   11/2012  Nishioka et al.
2016/0279985 A1*  9/2016   Kujiraoka ............. B41J 19/142

FOREIGN PATENT DOCUMENTS

JP        2012-236287 A    12/2012

* cited by examiner

*Primary Examiner* — Julian D Huffman
(74) *Attorney, Agent, or Firm* — VENABLE LLP

(57) ABSTRACT

Bidirectional multi-pass printing with three or more passes prints a high-quality image with reduced time difference unevenness. To this end, an image in a unit region on a printing medium is printed by a print head performing 2N+1 bidirectional print scans (where N is a natural number). In this printing, a print permission rate for an even-numbered print scan of the 2N+1 times of the print scans is set lower than the print permission rate for an odd-numbered print scan of the 2N+1 times of the print scans.

25 Claims, 22 Drawing Sheets

PRINTING APPARATUS AND PRINTING METHOD

BACKGROUND OF THE INVENTION

Field of the Invention

The present invention relates to a printing method and a printing apparatus.

Description of the Related Art

Some serial inkjet printing apparatuses perform multi-pass printing in which a plurality of print scans are performed to complete an image in a region which is printable by a print head with a single print scan, with a conveyance operation being performed between the print scans, the conveyance operation involving conveying a printing medium by a distance shorter than the print width covered by the print head. Should ejection performance vary among a plurality of nozzles arranged in the print head, multi-pass printing can make density unevenness due to the varying ejection performance less noticeable in the image.

Also, to improve throughput, some serial inkjet printing apparatuses perform bidirectional printing, which is to print an image by ejecting ink in both of a forward scan and a backward scan of the print head.

However, a combination of the multi-pass printing and the bidirectional printing may create a new problem: time difference unevenness. Here, time difference unevenness means unevenness of density or unevenness of color development caused in a case where a period of time that elapses between a plurality of print scans necessary to complete an image in a unit area differs depending on the position of the unit area on a printing medium.

Japanese Patent Laid-Open No. 2012-236287 discloses a method for reducing time difference unevenness caused in two-pass bidirectional printing by making the print coverage for each unit area higher for the first pass than for the second pass while changing the conveyance amount and conveyance direction in each conveyance operation.

In an inkjet printing apparatus, the number of passes in multi-pass printing is typically changed according to the type of a printing medium, the purpose of the image, or the like. However, Japanese Patent Laid-Open No. 2012-236287 discloses a case of two-pass bidirectional printing, but does not describe multi-mass printing with three or more passes. Thus, it has been difficult for a conventional inkjet printing apparatus to reduce time difference unevenness in a case of performing multi-pass printing with three or more passes.

SUMMARY OF THE INVENTION

The present invention has been made to solve the above problem, and therefore has an object to print a high-quality image with reduced time difference unevenness in bidirectional multi-pass printing with three or more passes.

In a first aspect of the present invention, there is provided a printing apparatus comprising: a print head in which a plurality of nozzles for ejecting ink are arranged in a predetermined direction; a scan unit configured to perform print scans by moving the print head relative to a printing medium alternately in a forward direction and a backward direction which intersect with the predetermined direction; a conveyance unit configured to convey the printing medium in a direction intersecting with the print scans; and a control unit configured to control the print head, the scan unit, and the conveyance unit to print an image in accordance with image data onto the printing medium, wherein the control unit performs control such that an image in a unit region on the printing medium is printed by 2N+1 times of the print scans, where N is a natural number, and a print permission rate for an even-numbered print scan of the 2N+1 times of the print scans is lower than a print permission rate for an odd-numbered print scan of the 2N+1 times of the print scans.

In a second aspect of the present invention, there is provided a printing method comprising: performing print scans by moving a print head in which a plurality of nozzles for ejecting ink are arranged in a predetermined direction relative to a printing medium alternately in a forward direction and a backward direction which intersect with the predetermined direction; and conveying the printing medium in a direction intersecting with the print scans, wherein an image in a unit region on the printing medium is printed by 2N+1 times of the print scans, where N is a natural number, each in accordance with a predefined print permission rate, and the print permission rate for an even-numbered print scan of the 2N+1 times of the print scans is lower than the print permission rate for an odd-numbered print scan of the 2N+1 times of the print scans.

In a third aspect of the present invention, there is provided a non-transitory computer-readable storage medium storing a program for causing a computer to execute a printing method for printing an image on a printing medium, the printing method comprising: performing print scans by moving a print head in which a plurality of nozzles for ejecting ink are arranged in a predetermined direction relative to a printing medium alternately in a forward direction and a backward direction which intersect with the predetermined direction; and conveying the printing medium in a direction intersecting with the print scans, wherein an image in a unit region on the printing medium is printed by 2N+1 times of the print scans, where N is a natural number, each in accordance with a predefined print permission rate, and a print permission rate for an even-numbered print scan of the 2N+1 times of the print scans is lower than the print permission rate for an odd-numbered print scan of the 2N+1 times of the print scans.

Further features of the present invention will become apparent from the following description of exemplary embodiments with reference to the attached drawings.

DESCRIPTION OF THE EMBODIMENTS

First Embodiment

Figure 1:
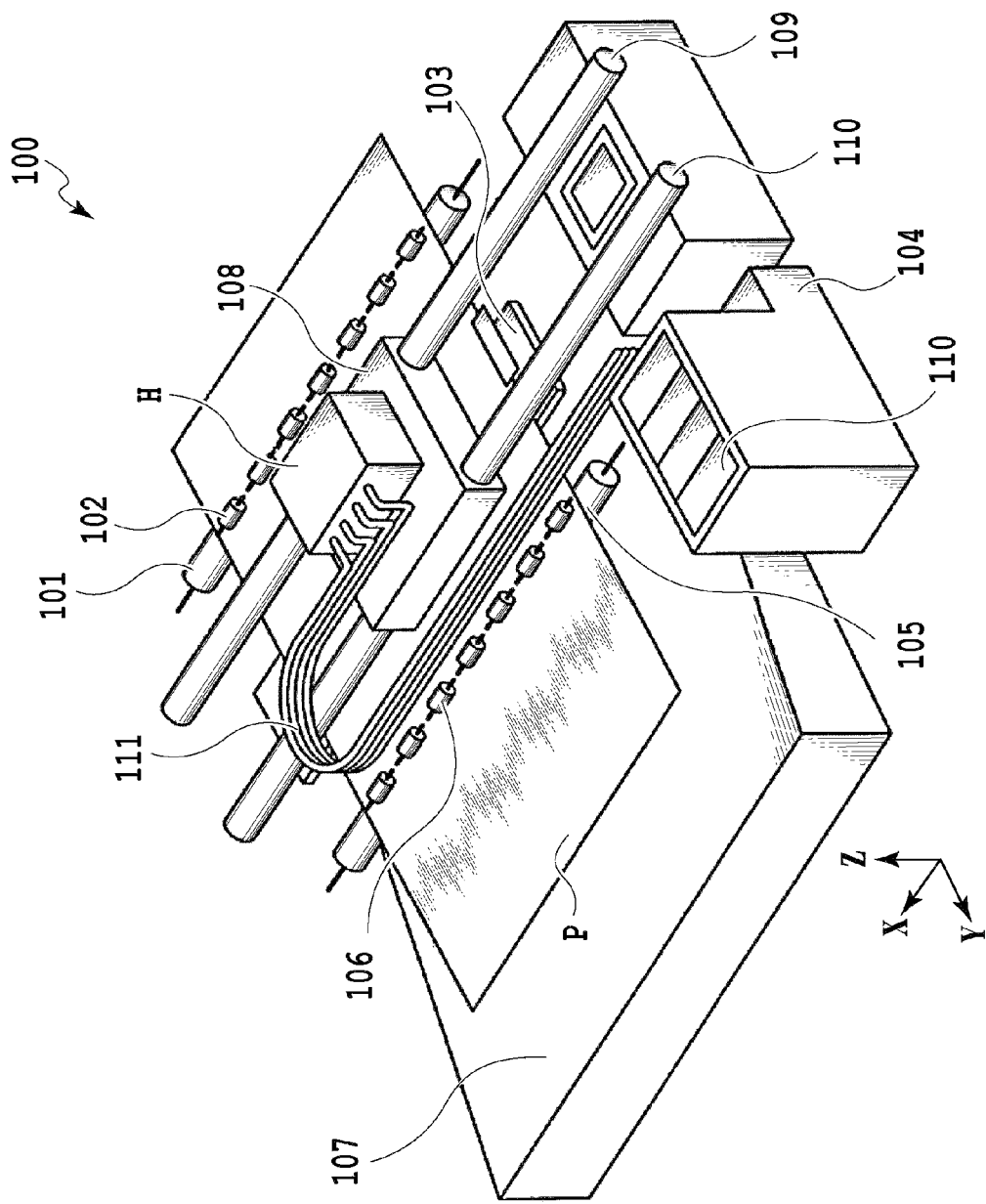
FIG. 1 is a diagram showing an overview of a print unit of an inkjet printing apparatus.

FIG. 1 is a diagram showing an overview of a print unit of an inkjet printing apparatus 100 (hereinafter also referred to simply as a printing apparatus) employable in the present invention. Throughout the drawings, an X-direction represents a direction in which a print head H scans, a Y-direction represents a direction in which a printing medium P is conveyed, and a Z-direction represents a direction opposite from a direction in which the print head H ejects ink. In the present embodiment, the Z-direction is opposite from the direction of gravitational force.

The print head H of the present embodiment is mounted in a carriage 108 in a detachable manner. While being guided and supported by guide rails 109 and 110, the carriage 108 mounted with the print head H can move in the ±X directions as driven by a carriage motor 305M (see FIG. 3) as a drive source. A platen 103 is disposed at a position facing the ejection port surface of the print head H and supports part of a printing medium P from below, the part being a region to be printed by the print head H.

Disposed upstream of the platen 103 in the conveyance direction (the Y-direction) are a conveyance roller 101 and pinch rollers 102 that follow the conveyance roller 101. Disposed downstream of the platen 103 are a discharge roller 105 and spurs 106 that follow the discharge roller 105. By being nipped between the conveyance roller 101 and the pinch rollers 102, nipped between the discharge roller 105 and the spurs 106, and supported by the platen 103, the region of the printing medium P facing the print head H is maintained flat relative to the ejection port surface of the print head H.

The print head H in the present embodiment is capable of ejecting ink of four colors: black (K), cyan (C), magenta (M), and yellow (Y). The printing apparatus 100 is provided with a tank loading unit 104 to which to load ink tanks 110 that individually house inks of these four colors. The ink housed in each ink tank 110 is supplied to the print head H via an ink tube 111.

While the carriage 108 moves in the +X-direction or the −X-direction at a predetermined speed, the print head H ejects ink according to print data. As a result, an image of one band is printed on the printing medium P. After the completion of the one-band print scan, the conveyance roller 101 and the discharge roller 105 are rotated as driven by a conveyance motor 304M (see FIG. 3) as a drive source, thereby conveying the printing medium P by a predetermined amount in the Y-direction intersecting with the print scan direction. After thus alternately repeating the print scan and the conveyance operation, an image is formed on the printing medium P in stages.

The printing medium P on which printing has been completed is conveyed in the Y-direction by the rotation of the discharge roller 105 and is discharged to a discharge tray 107.

Figure 2A:
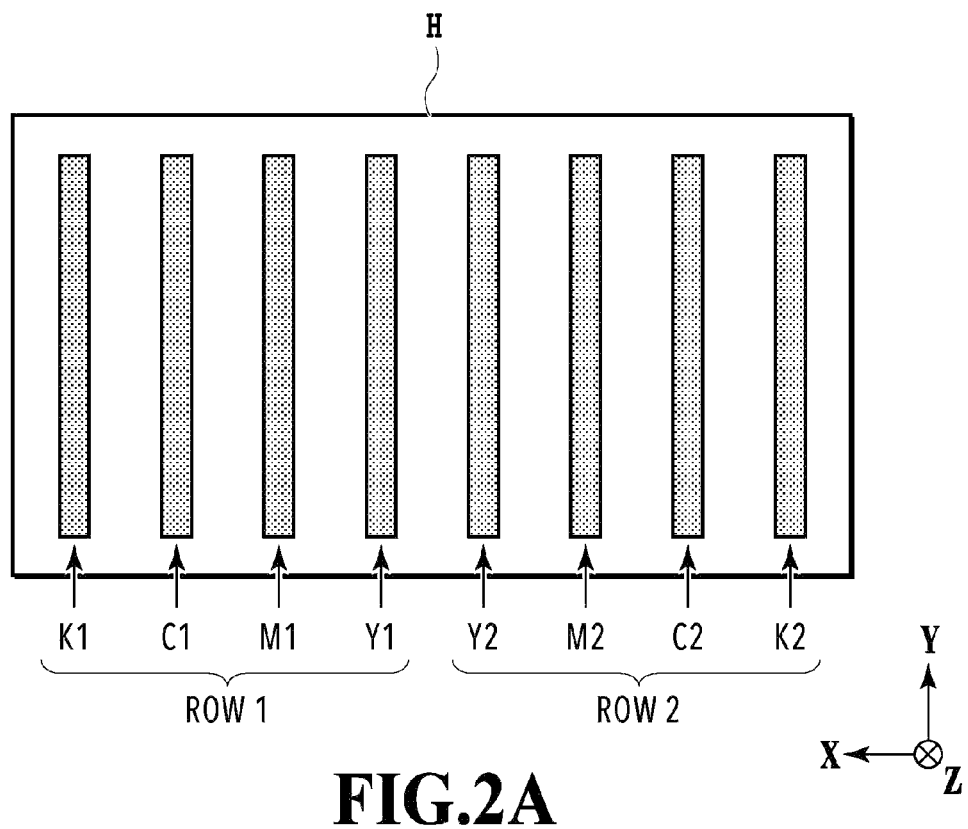
FIGS. 2A and 2B is a diagrams illustrating the ejection port surface of a print head H.
Figure 2B:
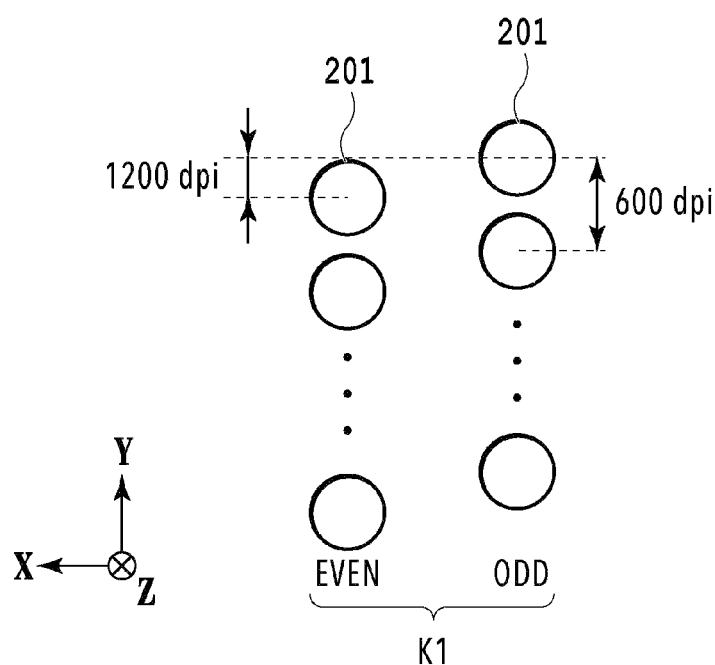

FIGS. 2A and 2B are diagrams illustrating the ejection port surface of the print head H. FIG. 2A is an overall view of the ejection port surface. On the ejection port surface of the print head H, nozzle rows for ejecting black (K), cyan (C), magenta (M), and yellow (Y) inks are arranged in such a manner that there are two rows for each color, disposed symmetrically in the X-direction. Specifically, a row K1 and a row K2 for ejecting black ink are disposed at the respective ends in the X-direction, and a row C1 and a row C2 for ejecting cyan ink are disposed inward of the row K1 and the row K2. A row M1 and a row M2 for ejecting magenta ink are disposed inward of the row C1 and the row C2, and a row Y1 and a row Y2 for ejecting yellow ink are disposed inward of the row M1 and the row M2.

In a case of performing print scans using such a print head, the order of applying ink to a printing medium is black→cyan→magenta→yellow→yellow→magenta→cyan→black for both of a forward scan in the +X-direction and a backward scan in the −X-direction. Thus, the order of applying ink to a printing medium is maintained the same even in a case of performing bidirectional printing, which can contribute to mitigation of the color order unevenness caused by the difference in the ink application order, which is likely to be a problem in a serial inkjet printing apparatus. Hereinafter, such a head having nozzle rows of a plurality of inks nozzle rows disposed symmetrically in the X-direction is referred to as a symmetrical head.

FIG. 2B is an enlarged view of the row K1. Although the row K1 is described here as an example, the other rows have the same configuration as well. The row K1 has an Even row and an Odd row, each of which has 120 nozzles 201 arranged in the Y-direction at a pitch of 600 dots per inch (dpi), each nozzle 201 being able to eject 5 pl of ink. The Even row and the Odd row are offset from each other by half the pitch (1200 dpi) in the Y-direction.

A heater (not shown) is disposed immediately below each nozzle 201 (the +Z direction). The heaters are heated according to print data, and then, film boiling takes places in the ink immediately above the heaters. By the growing energy of the bubble thus generated, the ink is ejected from each of the nozzles 201 as a droplet.

With such a configuration, ink is ejected from the nozzles 201 according to print data with the print head H moving in the ±X directions, so that dots are printed on the printing medium in the Y-direction at a resolution of 1200 dpi.

Figure 3:
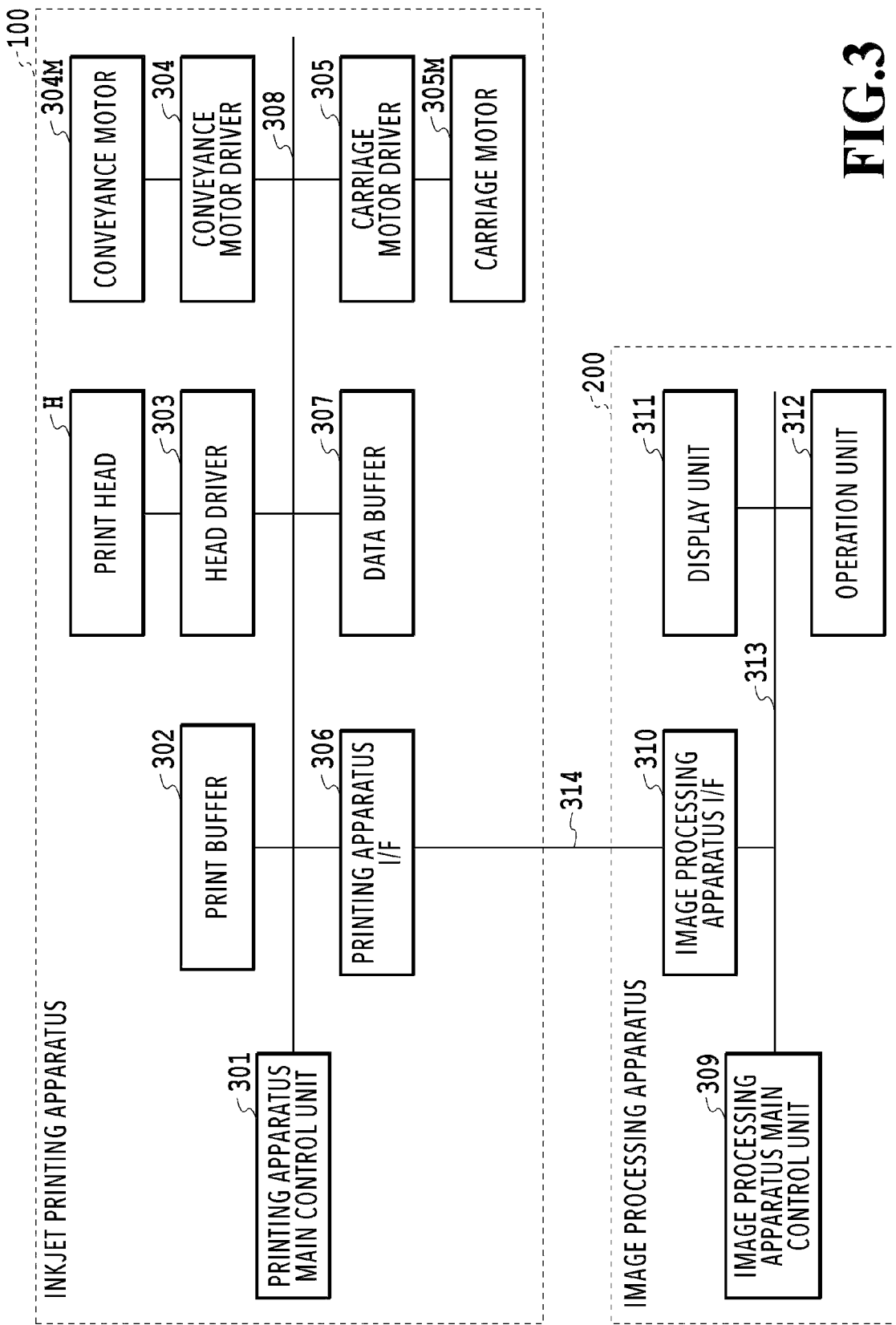
FIG. 3 is a block diagram illustrating the control configuration of an inkjet printing system.

FIG. 3 is a block diagram illustrating the control configuration of an inkjet printing system applicable to the present embodiment. An inkjet printing system of the present embodiment includes the inkjet printing apparatus 100 and an image processing apparatus 200.

In the inkjet printing apparatus 100, a printing apparatus main control unit 301 is formed by a central processing unit (CPU), a read-only memory (ROM), a random-access memory (RAM), and the like and performs overall control of the printing apparatus. A print buffer 302 stores therein print data yet to be transferred to the print head H, as raster data. A head driver 303 controls driving of the print head H according to the print data stored in the print buffer 302.

A conveyance motor driver 304 controls feeding, conveyance, and discharge of the printing medium P by driving the conveyance motor 304M. A carriage motor driver 305 controls the movement of the carriage 108 by driving the carriage motor 305M.

A printing apparatus interface (I/F) 306 gives and receives data signals to and from the image processing apparatus 200. A data buffer 307 temporarily stores image data received from the image processing apparatus 200. A system bus 308 connects the functions of the printing apparatus 100 to one another.

In the image processing apparatus 200, an image processing apparatus main control unit 309 is formed by a CPU, a ROM, a RAM, and the like and performs overall control of the image processing apparatus. An image processing apparatus interface (I/F) 310 gives and receives data signals to and from the printing apparatus 100. A display unit 311 is formed by a liquid crystal display (LCD) or the like and displays various pieces of information to a user. An operation unit 312 is a unit used for user operation and can be, for example, a keyboard and/or a mouse. A system bus 313 connects the functions of the image processing apparatus 200 to one another.

An I/F signal line 314 connects the printing apparatus 100 and the image processing apparatus 200 to each other. As the type of the I/F signal line 314, for example, one with a Centronics interface can be used.

Figure 4:
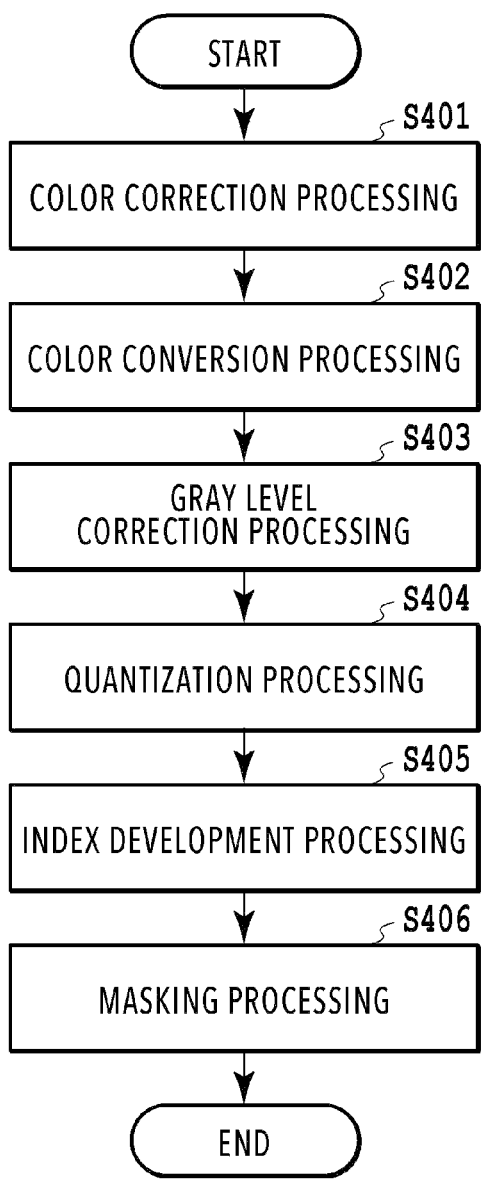
FIG. 4 is a flowchart illustrating the steps of image processing.

FIG. 4 is a flowchart illustrating the steps of image processing performed by the inkjet printing system of the present embodiment upon occurrence of a print command. This processing is commenced in response to a user's input of a print command via the operation unit 312 to print an image generated by, e.g., an application in the image processing apparatus 200. This processing is performed by the image processing apparatus main control unit 309 and the printing apparatus main control unit 301 cooperating with each other, and there is no imitation as to which steps are performed by the image processing apparatus main control unit 309 and which steps are performed by the printing apparatus main control unit 301. In the following description, the image processing apparatus main control unit 309 performs steps up to the quantization processing in S404, and the printing apparatus main control unit 301 performs the steps from the index development processing in S405 onward.

Upon occurrence of a print command, first in Step S401, color correction processing is performed on the image data to be processed. In the present embodiment, image data generated by an application in the image processing apparatus 200 is 8-bit RGB data at 600 dpi. In the color correction processing, 8-bit RGB data represented in sRGB space is converted into 8-bit RGB data corresponding to color space representable by the printing apparatus 100. Specifically, a prepared lookup table or the like is used to convert the pixel values (R, G, B) into different pixel values (R', G', B').

In Step S402, color conversion processing is performed on the image data obtained by the color correction processing. In the color conversion processing, the 8-bit RGB data in luminance values is converted into 8-bit CMYK data in density values. CMYK correspond to the ink colors of cyan, magenta, yellow, and black, respectively, used by the printing apparatus 100. Specifically, a prepared lookup table or the like is used to convert 8-bit (256 gray level) pixel values (R', G', B') into 8-bit (256 gray level) pixel values (C, M, Y, K).

In Step S403, gray level correction processing is performed on the image data obtained by the color conversion processing. Typically, the number of dots printed on a printing medium and the optical density achieved on the printing medium by those dots do not have a linear relation. Thus, the pixel values C, M, Y, K in density values are each corrected to make this relation linear. Specifically, one-dimensional lookup tables prepared for the respective ink colors are used to convert the 8-bit (256 gray level) pixel values C, M, Y, K into also-8-bit pixel values C', M', Y', K', respectively.

In Step S404, quantization processing is performed on the image data obtained by the gray level correction processing. Although the method for the quantization processing is not limited to any particular method, a dither pattern predefining thresholds for the respective pixels is referred to in the present embodiment. Then, the 8-bit (256 gray level) pixel values C', M', Y', K' are converted into 2-bit (3-gray level) pixel values C'', M'', Y'', K'' representable in the level of 0 to 2.

In Step S405, index development processing is performed on the image data obtained by the quantization processing. In the index development processing, based on the pixel value (0 to 2) of each of the pixels at 600 dpi×600 dpi, whether to or not to print a dot is set for each of pixels at 600 dpi in the X-direction and 1200 dpi in the Y-direction. In this event, for each of the pixels for which it is set to print a dot, it is set whether the dot is to be printed by the row 1 or the row 2.

Figures 5A, 5B:
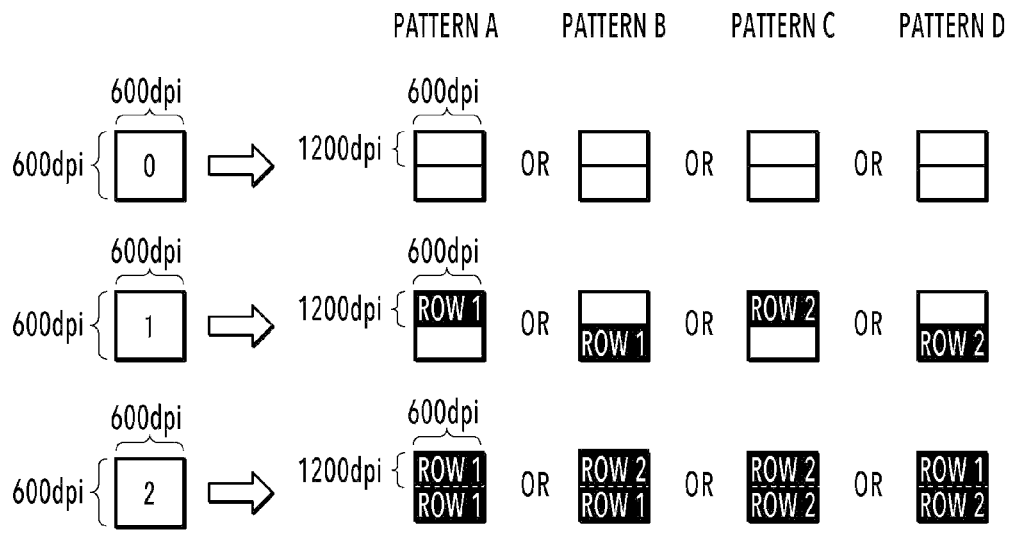
FIGS. 5A and 5B are diagrams illustrating a dot arrangement pattern.

FIGS. 5A and 5B are diagrams illustrating dot arrangement patterns referred to by the index development processing. FIG. 5A is a diagram showing the relations between a pixel value (on the left) corresponding to one pixel region of 600 dpi×600 dpi and dot arrangement patterns (on the right). One pixel region at 600 dpi in the X-direction×600 dpi in the Y-direction corresponds to two pixel regions adjacent in the Y direction at a resolution of 600 dpi in the X-direction× 1200 dpi in the Y direction. Then, of these two pixel regions, the upper one is a pixel region printable by nozzles in an Odd row, and the lower one is a pixel region printable by nozzles in an Even row. In FIG. 5A, each set of two pixel regions is shown such that a black pixel is a pixel region where a dot is to be printed, and a white pixel is a pixel region where a dot is not to be printed.

For a pixel value of 0 (zero), a dot is printed in neither one of the two pixel regions corresponding to that pixel.

For a pixel value of 1, a dot is printed in either one of the two pixel regions corresponding to that pixel. The dot is printed by either one of the nozzle row 1 or the nozzle row 2 (see FIG. 2A). Specifically, for a pixel value of 1, there are four dot printing patterns which are shown under A to D.

Here, the pattern A is printing a dot in the upper pixel region with the nozzle row 1. The pattern B is printing a dot in the lower pixel region with the nozzle row 1. The pattern C is printing a dot in the upper pixel region with the nozzle row 2. The pattern D is printing a dot in the lower pixel region with the nozzle row 2.

In this way, four dot arrangement patterns shown under A to D are prepared in the present embodiment. For a pixel value of 2 as well, four dot arrangement patterns shown under A to D are prepared. Then, in the present embodiment, such four patterns are used while they are switched sequentially according to a position on a printing medium.

FIG. 5B shows an index table which makes associations and sets dot arrangement patterns A to D to use for the respective pixel positions (XY coordinate positions) at 600 dpi×600 dpi. Although the index table shown is for eight pixels×eight pixels, the index table may be smaller or larger. Such an index table is used repeatedly in the X-direction and the Y-direction. Setting the dot arrangement patterns A to D equally in the index table enables evening out of the ejection frequencies of the plurality of nozzle rows arranged in the print head H and stabilizing of refills of the nozzles. Note that the dot arrangement patterns shown in FIG. 5A and the index table shown in FIG. 5B are stored in the ROM or the like in advance.

Returning to the flowchart in FIG. 4, in Step S406, masking processing is performed on the image data obtained by the index development processing. The masking processing determines, for each pixel for which printing of a dot (1) is set, which print scan is to print the dot, with respect to each nozzle row.

Figure 6:
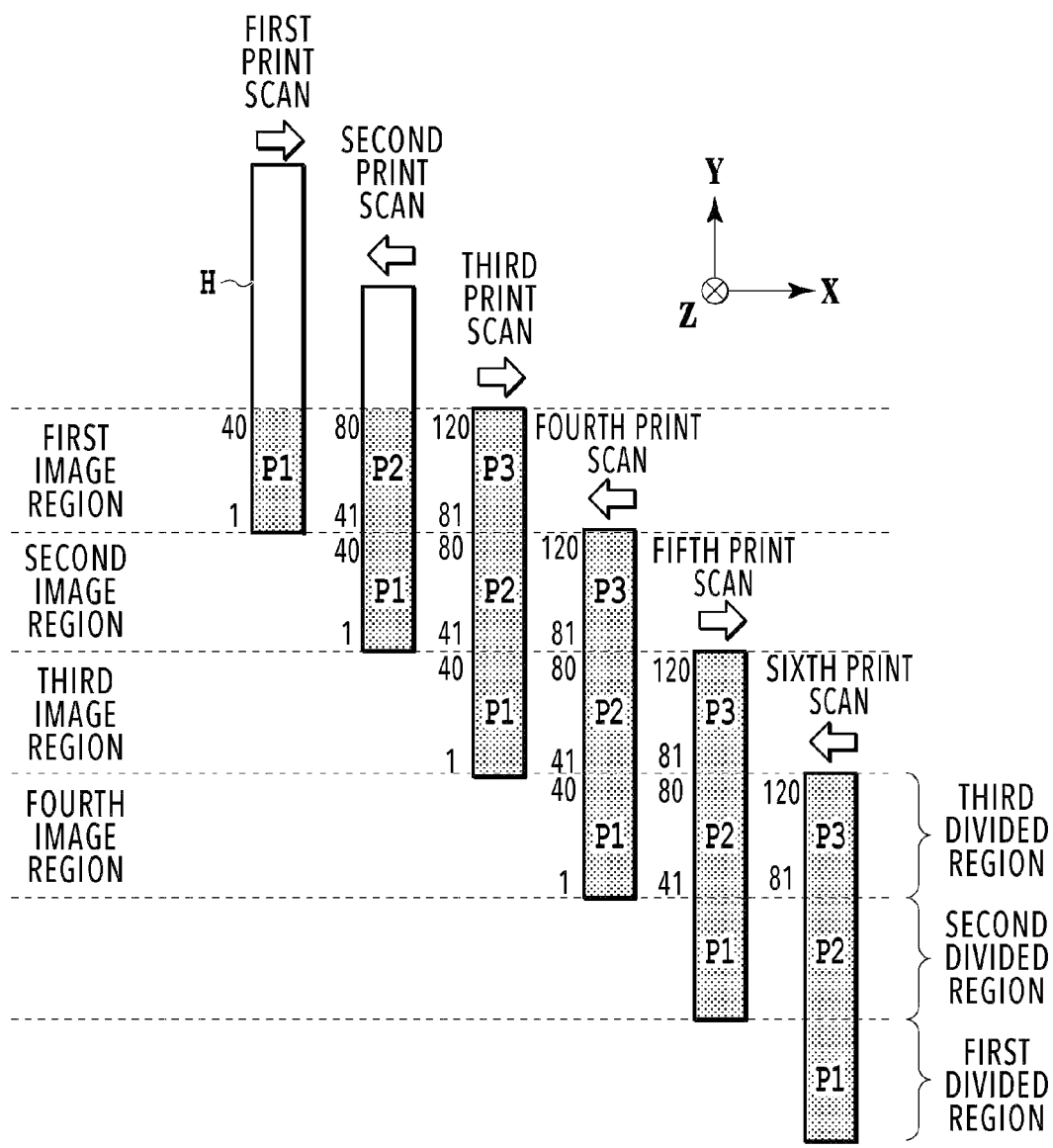
FIG. 6 is a diagram illustrating three-pass bidirectional printing.

FIG. 6 is a diagram illustrating multi-pass printing employed in the present embodiment. The present embodiment employs three-pass bidirectional printing. In a case of performing three-pass printing, 120 nozzles arranged in one nozzle row (an Odd row or an Even row) are divided into three regions each with 40 nozzles, and mask patterns are assigned to the respective divided regions, the mask patterns defining for each pixel whether a dot is permitted (1) or not permitted (0) to be printed. In FIG. 6, P1 is a mask pattern used for a first divided region most upstream in the Y-direction, P2 is a mask pattern used for a second divided region at the center, and P3 is a mask pattern used for a third divided region most downstream. The mask patterns P1, P2, and P3 have a complementary relationship among them. A logical AND is performed between the print data on each pixel determined by the index development processing and the mask patterns P1 to P3, thereby determining print data to be actually printed by each print scan.

In a first print scan, the first divided region is used to perform a print scan in the forward direction (the +X-direction). As a result, a dot pattern in accordance with the mask pattern P1 is printed on a first image region on the printing medium P. After the first scan is complete, the printing medium P is conveyed in the +Y-direction by a distance corresponding to the divided region (a distance corresponding to 40 nozzles). For the illustration purposes, FIG. 6 shows a mode where the print head H is moved in the −Y-direction relative to the printing medium P.

In a second print scan, the first divided region and the second divided region are used to perform a print scan in the backward direction (the −X-direction). As a result, a dot pattern in accordance with the mask pattern P1 is printed on a second image region on the printing medium P. Also, a dot pattern in accordance with the mask pattern P2 is printed on the first image region, overlaying on the dot pattern printed in accordance with the mask pattern P1. After the second scan is complete, the printing medium P is conveyed in the +Y-direction by a distance corresponding to 40 nozzles.

In a third print scan, the first to third divided regions are used to perform a print scan in the forward direction (the +X-direction). As a result, a dot pattern in accordance with the mask pattern P1 is printed on a third image region on the printing medium P. Also, a dot pattern in accordance with the mask pattern P2 is printed on the second image region, overlaying on the dot pattern printed in accordance with the mask pattern P1, and a dot pattern in accordance with the mask pattern P3 is printed on the first image region, overlaying on the dot patterns printed in accordance with the mask patterns P1 and P2. Since the mask patterns P1, P2, and P3 have a complementary relation with one another, once the third print scan is completed, an image in the first image region is complete. After the third print scan is complete, the printing medium P is conveyed in the +Y-direction by a distance corresponding to 40 nozzles.

After that, a print scan in the backward direction and a print scan in the forward direction are alternately performed using the first to third divided regions, with the conveyance operation by a distance corresponding to 40 nozzles being performed between the print scans. Every time a print scan is performed, an image in one image region is completed.

Figure 7:
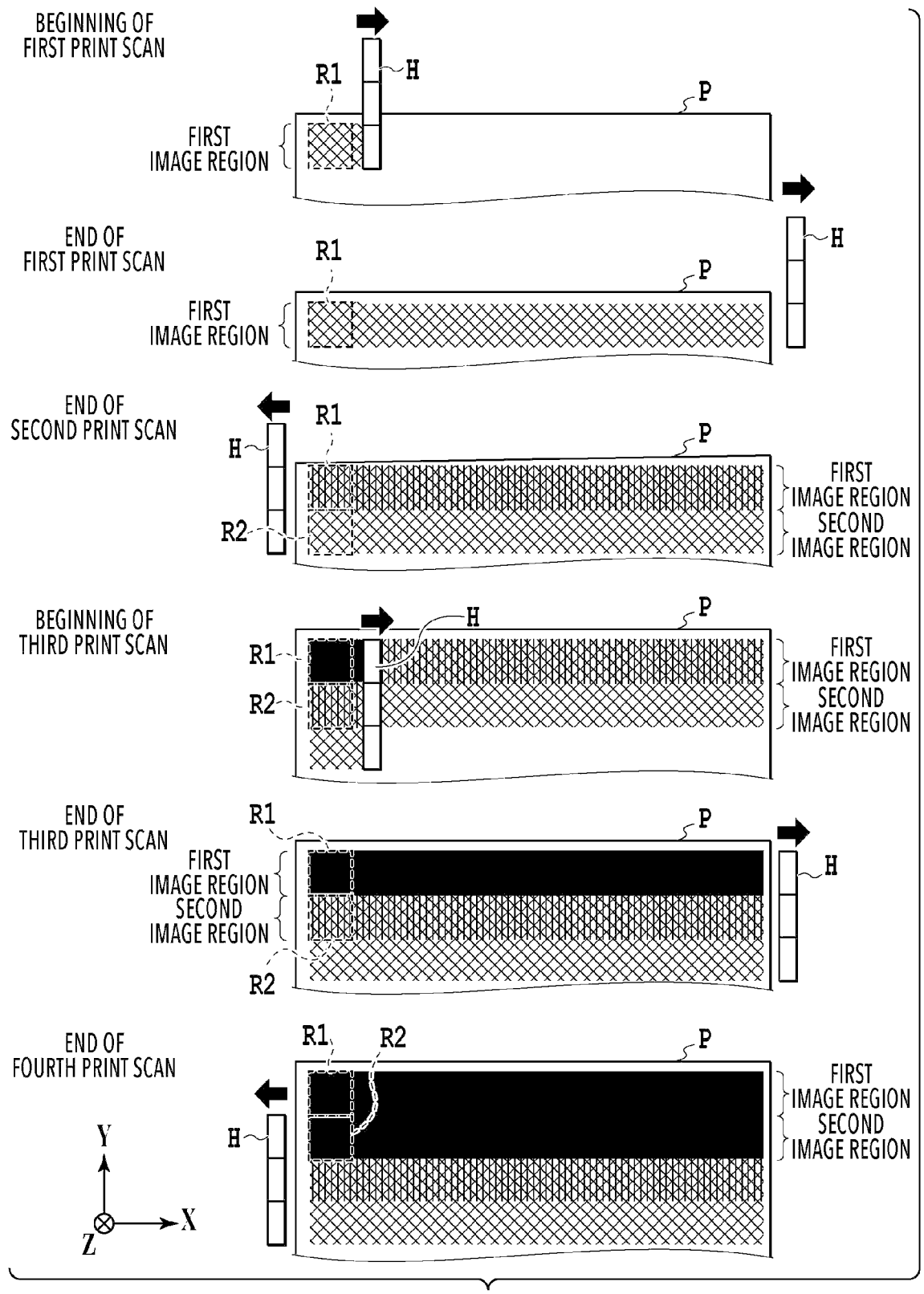
FIG. 7 is a diagram showing timing of ink application in three-pass bidirectional printing.

FIG. 7 is a diagram illustrating timing at which ink is applied to each region in a case of performing the three-pass bidirectional printing described above. The first to fourth print scans shown in FIG. 7 correspond to the first to fourth print scans shown in FIG. 6.

As also described using FIG. 6, the first image region is printed by the first print scan which is a forward scan, the second print scan which is a backward scan, and the third print scan which is a forward scan. Thus, to a region R1 located at the left edge of the first image region, ink is applied at the beginning of the first print scan, at the end of the second print scan, and at the beginning of the third print scan. Meanwhile, the second image region is printed by the second print scan which is a backward scan, the third print scan which is a forward scan, and a fourth print scan which is a backward scan. Thus, to a region R2 located at the left edge of the second image region, ink is applied at the end of the second print scan, at the beginning of the third print scan, and at the end of the fourth print scan.

Thus, the regions R1 and R2 adjacent in the Y-direction are both subjected to ink application by three print scans, but the intervals of the ink application are different from each other. Note that a region which is located at the left edge of the third image region and is adjacent to the region R2 is subjected to ink application at the same intervals as the region R1, and a region which is located at the left edge of the fourth image region and is adjacent to the region located at the left edge of the third image region is subjected to ink application at the same intervals as the region R2. Thus, at the left edge of a printing medium, two kinds of regions with different ink application intervals from each other are arranged alternately in the Y-direction.

Figure 8A:
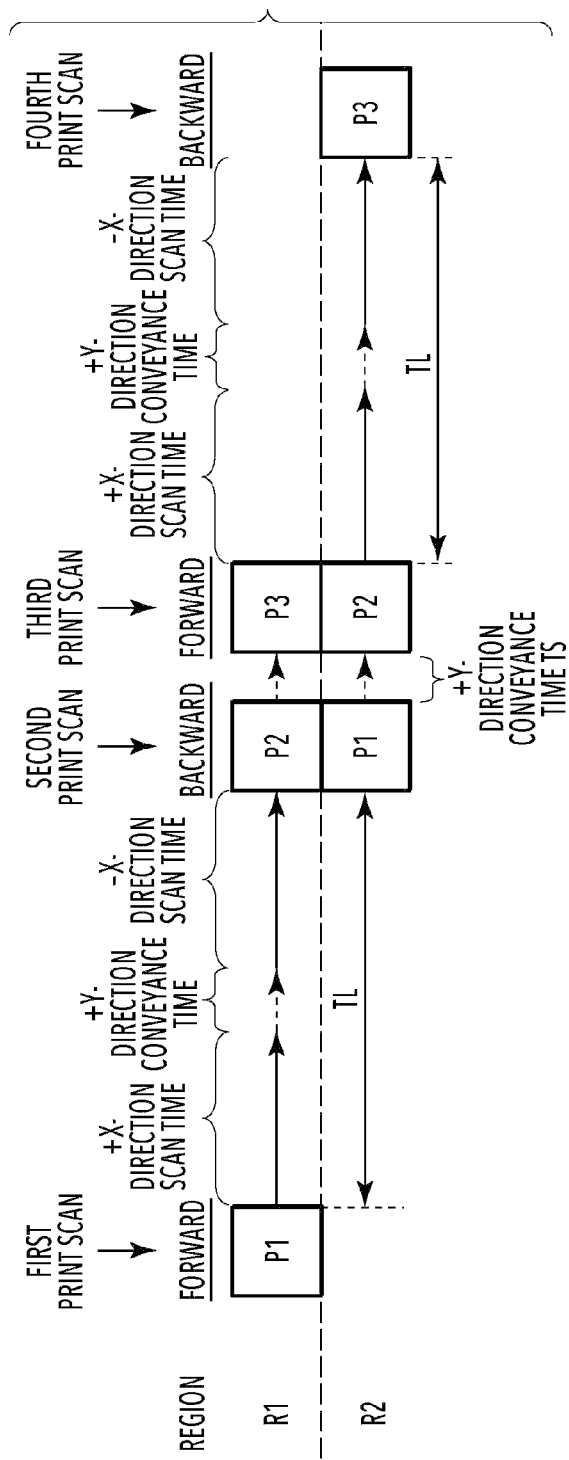
FIGS. 8A and 8B are schematic diagrams comparing ink application timing between regions.
Figure 8B:
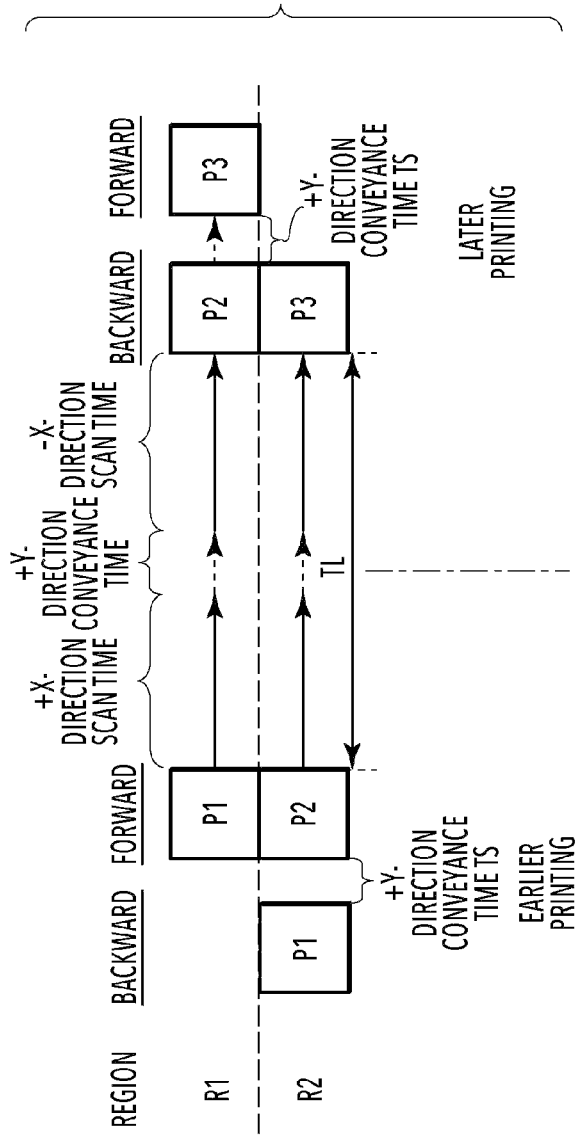

FIGS. 8A and 8B are schematic diagrams comparing the ink application timing between regions.

For the region R1, time TL elapses from the ink application by the first print scan to the ink application by the second print scan, the time TL including the time it takes for the carriage 108 to move to the right end, the time it takes for the conveyance operation, and the time it takes for the carriage 108 to move to the left end. On the other hand, only time TS elapses from the ink application by the second print scan to the ink application by the third print scan, the time TS being the time it takes for the conveyance operation. In other words, for the region R1, the longer time TL elapses from the first application of ink to the second application of ink, while the shorter time TS elapses from the second application of ink to the third application of ink.

For the region R2, only the time TS for the conveyance operation elapses from the ink application by the second print scan to the ink application by the third print scan. On the other hand, the time TL elapses from the ink application by the third print scan to the ink application by the fourth print scan, the time TL including the time it takes for the carriage 108 to move to the right end in the forward scan, the time it takes for the conveyance operation, and the time it takes for the carriage 108 to move to the left end for in backward scan. In other words, for the region R2, the shorter time TS elapses from the first application of ink to the second application of ink, while the longer time TL elapses from the second application of ink to the third application of ink.

FIG. 8A shows the timings at which ink is applied to the regions R1, R2 chronologically, while FIG. 8B shows the timings of the ink application to the regions R1, R2 based on the longer elapsing time TL. Hereinafter, a print scan performed before the lapse time TL is referred to as earlier printing, and a print scan performed after the lapse time TL is referred to as later printing. Thus, for the region R1, the printing in accordance with the mask pattern P1 is the earlier printing, and the printing in accordance with the mask patterns P2 and P3 is the later printing. By contrast, for the region R2, the printing in accordance with the mask patterns P1 and P2 is the earlier printing, and the printing in accordance with the mask pattern P3 is the later printing.

Assuming here that the scan width covered by the carriage 108 is eight inches and the scanning rate is 20 inches per second, each scan in the forward or backward direction takes 0.4 seconds. It is also assumed here that the conveyance operation takes approximately 0.1 seconds. In this case, for the two lengths of elapsing time occurring during the three-time ink application, the long elapsing time TL is approximately 0.9 seconds, and the short elapsing time TS is approximately 0.1 seconds.

FIGS. 9A to 9D are schematic diagrams illustrating how ink permeates depending on the amount of ink applied and the timing of the ink application. FIGS. 9A to 9D show how ink is applied to the printing medium P using sectional views. The printing medium P has therein large capillaries where ink is relatively easy to permeate and small capillaries where ink is relatively difficult to permeate.

Figure 9A:
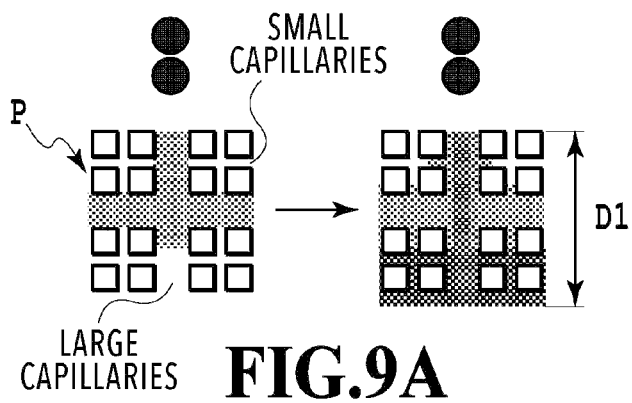
FIGS. 9A to 9D are schematic diagrams showing how ink permeates depending on the amount of ink applied and the timing of the ink application.
Figure 9B:

FIGS. 9A and 9B are diagrams illustrating the relation between the timing of applying ink and how the ink permeates. FIG. 9A shows how ink permeates in a case where a predetermined amount of ink is applied to the printing medium P, and then relatively immediately after that, the same amount of ink is applied thereto. In this case, by the time the succeeding ink is applied, the preceding ink has permeated into the large capillaries but not into the small capillaries. Thus, the succeeding ink permeates in a depth direction while avoiding the preceding ink and is then fixed at a position deeper than the preceding ink. In FIG. 9A, D1 denotes the distance of ink permeation in the depth direction.

FIG. 9B shows how ink permeates in a case where a predetermined amount of ink is applied to the printing medium P, and then after a relatively long time, the same amount of ink is applied thereto. In this case, by the time the succeeding ink is applied, the preceding ink has already permeated into the small capillaries. Thus, the succeeding ink permeates into the large capillaries near the surface without travelling in the depth direction too far, and is then fixed near the surface like the preceding ink which has permeated into the small capillaries. In FIG. 9B, D2 denotes the distance of ink permeation in the depth direction. In a comparison between FIGS. 9A and 9B, FIG. 9B has a higher optical density than FIG. 9A because more ink is fixed at the surface in FIG. 9B (D1>D2).

Figure 9C:
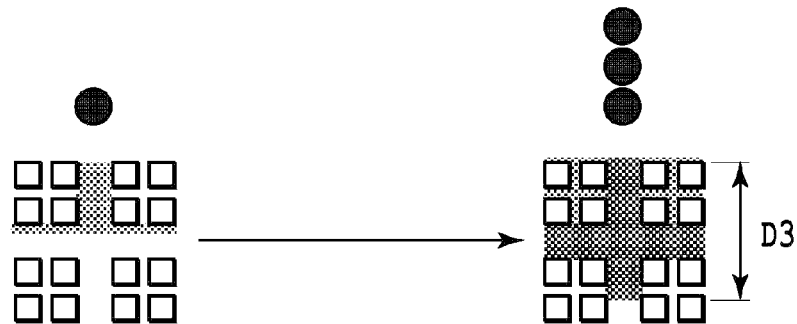
Figure 9D:
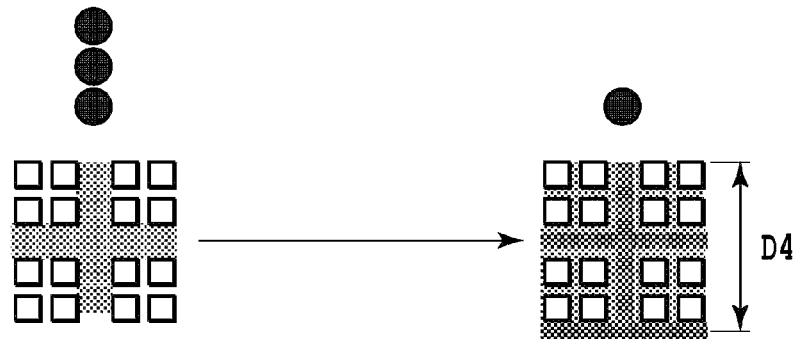

FIGS. 9C and 9D are diagrams illustrating the relation between the amount of ink applied and how the ink permeates. FIG. 9C shows how ink permeates in a case where a small amount of ink is applied to the printing medium P, and then after a predetermined period of time, a large amount of ink is applied thereto. Because the preceding ink is a small amount, the preceding ink permeates into the large capillaries near the surface, then permeates into the small capillaries near the surface and is fixed there. Meanwhile, the succeeding ink permeates into the large capillaries after the permeation of the preceding ink and is fixed there. In FIG. 9C, D3 denotes the distance of ink permeation in the depth direction.

FIG. 9D shows how ink permeates in a case where a large amount of ink is applied to the printing medium P, and then after the predetermined period of time, a small amount of ink is applied thereto. The preceding ink of the large amount permeates in the depth direction along the large capillaries. Although some of the preceding ink permeates into the surrounding small capillaries, most of the preceding ink remains in the large capillaries. Once the succeeding ink of the small amount is applied, the succeeding ink permeates in the depth direction while avoiding the preceding ink in the large capillaries, and is then fixed at positions deeper than the preceding ink. In FIG. 9D, D4 denotes the distance of ink permeation in the depth direction. In a comparison between FIGS. 9C and 9D, FIG. 9C has a higher optical density than FIG. 9D because more ink is fixed at the surface in FIG. 9C (D3<D4).

Referring back to FIG. 8B, ink application to the region R1 can be regarded as a combination of FIGS. 9B and 9C and ink application to the region R2 can be regarded as a combination of FIGS. 9B and 9D. Thus, at the left edge portion of the printing medium, the region R1 with a high optical density and the region R2 with a low optical density are arranged alternately in the Y-direction, and this is perceived as time difference unevenness.

Such time difference unevenness similarly occurs at the right edge portion of the image. Note, however, that the high-and-low relation between the optical density at the right edge portion of the first image region (an odd-numbered image region) and the optical density at the right edge portion of the second image region (an even-numbered image region) is reversed from that of the left edge portions. Also, such time difference unevenness is likely to be noticeable more at the both ends in the print scan direction than at the center.

As thus described, in three-pass bidirectional printing, the degree of the time difference unevenness is dependent on the time elapsing between the earlier printing and the later printing and the amounts of ink applied (print duty) by the earlier printing and the later printing. However, the former, i.e., the time elapsing between the earlier printing and the later printing, cannot be easily changed due to mechanical restraints. The latter, i.e., the amounts of ink applied (print duty) by the earlier printing and the later printing can be controlled by adjustment of the mask patterns P1 to P3 already described. In view of the above circumstances, the inventors of the present invention have created a mask pattern for three-pass bidirectional printing that makes time difference unevenness less noticeable.

Figure 10A:
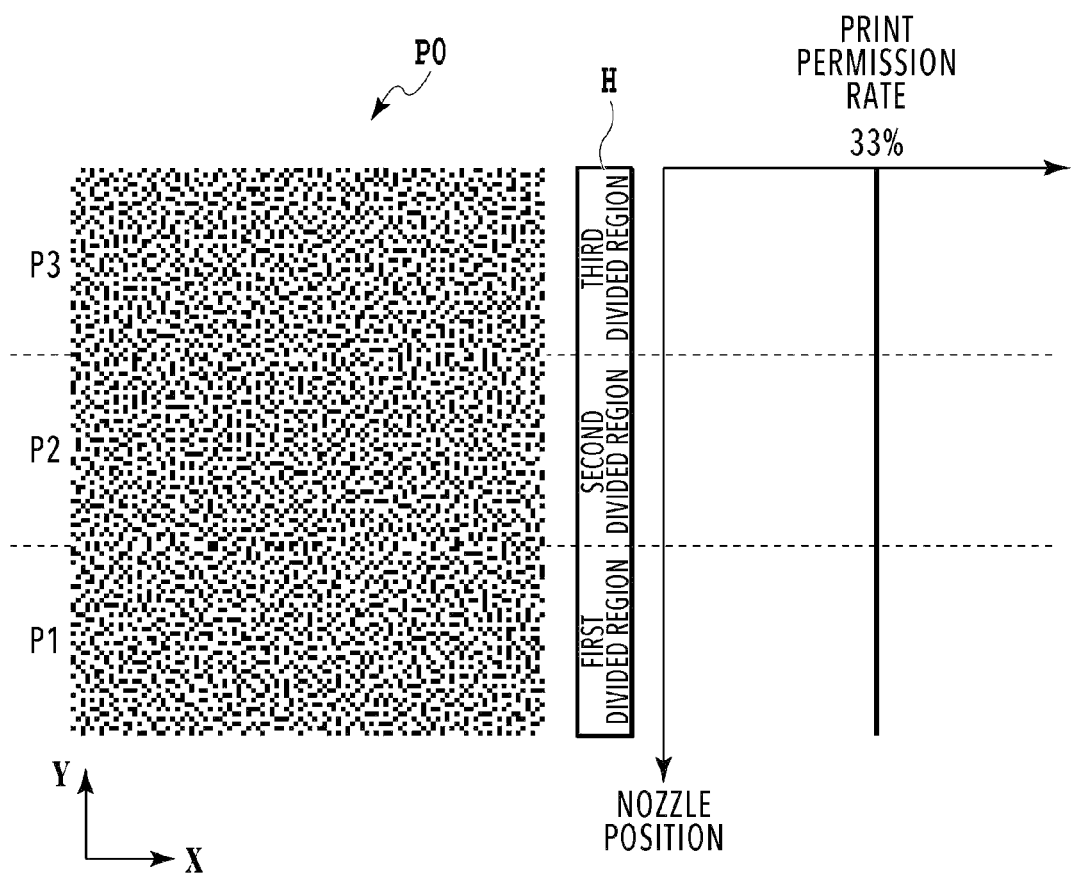
FIGS. 10A and 10B are diagrams showing a mask pattern typically used in three-pass bidirectional printing.
Figure 10B:
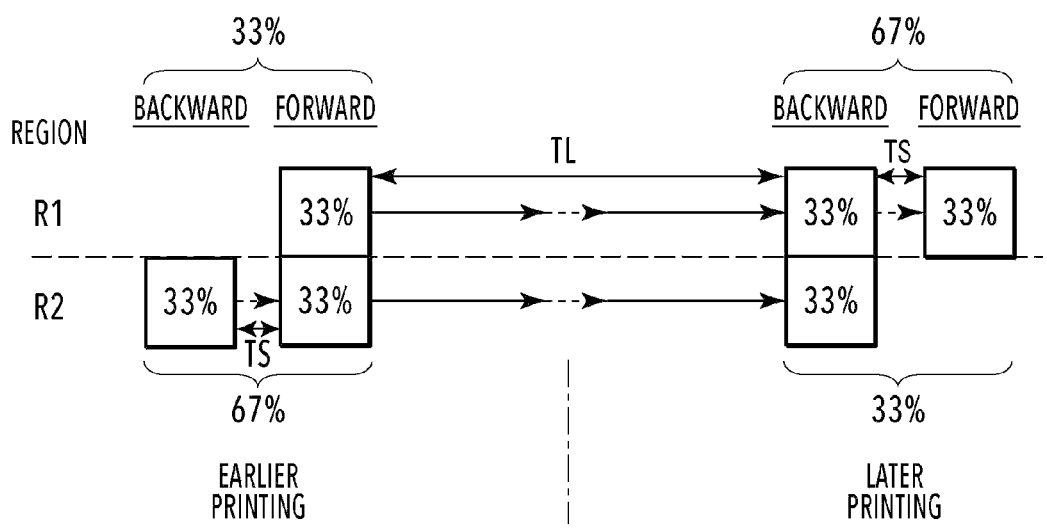

First, using FIGS. 10A and 10B, a description is given of a mask pattern typically used for three-pass bidirectional printing. FIG. 10A shows, on the left, a typical mask pattern P0 used by an Odd or Even row of any given nozzle row. The mask pattern P0 has pixel regions of 100 pixels in the X-direction×120 pixels in the Y direction. Each pixel corresponds to one pixel in 600 dpi×600 dpi, and for each of the pixel regions, it is defined whether a dot is permitted (black) or not permitted (white) to be printed. The number of pixels in the Y-direction corresponds to the number of nozzles in an Odd row or an Even row, and the upstream region with the 1st to 40th pixels corresponds to the mask pattern P1, the center region with the 41st to 80th pixels corresponds to the mask pattern P2, and the downstream region with the 81st to 120th pixels corresponds to the mask pattern P3 (see FIG. 6). For the X-direction, the mask pattern P0 is repeatedly used. Such a mask pattern are prepared for each of the Odd row and the Even row of each nozzle row.

FIG. 10A shows, on the right, a nozzle row on the print head H and the print permission rate for each nozzle. In the nozzle row, the forty nozzles which are upstream in the Y-direction correspond to the first divided region for which to use the mask pattern P1. The forty nozzles at the center correspond to the second divided region for which to use the mask pattern P2. The downstream forty nozzles correspond to the third divided region for which to use the mask pattern P3.

Herein, a print permission rate is the percentage of pixel regions permitted for printing in reference to the pixel regions printable with a single print scan. In the typical mask pattern P0 used for three-pass printing, the print permission rates for the pixel regions arranged in the Y-direction are, as shown in FIG. 10A, nearly equal (33%≈100%/3).

FIG. 10B is a diagram comparing the regions R1 and R2 in terms of the ink application process using the mask pattern P0 in FIG. 10A. For the region R1, the earlier printing (the first scan) is performed at approximately 33%, and after that, the later printing (the second and third scans) is performed at approximately 67%. For the region R2, the earlier printing (the second and third scans) is performed at approximately 67%, and after that, the later printing (the fourth scan) is performed at approximately 33%. In other words, to the region R1, ink is applied using the method in FIG. 9C in which the amount of ink applied in the later printing is more than the amount of ink applied in the earlier printing. By contrast, to the region R2, ink is applied using the method in FIG. 9D in which the amount of ink applied in the earlier printing is more than the amount of ink applied in the later printing. As a result, time difference unevenness may be perceived at the both ends of the printing medium.

Figure 11A:
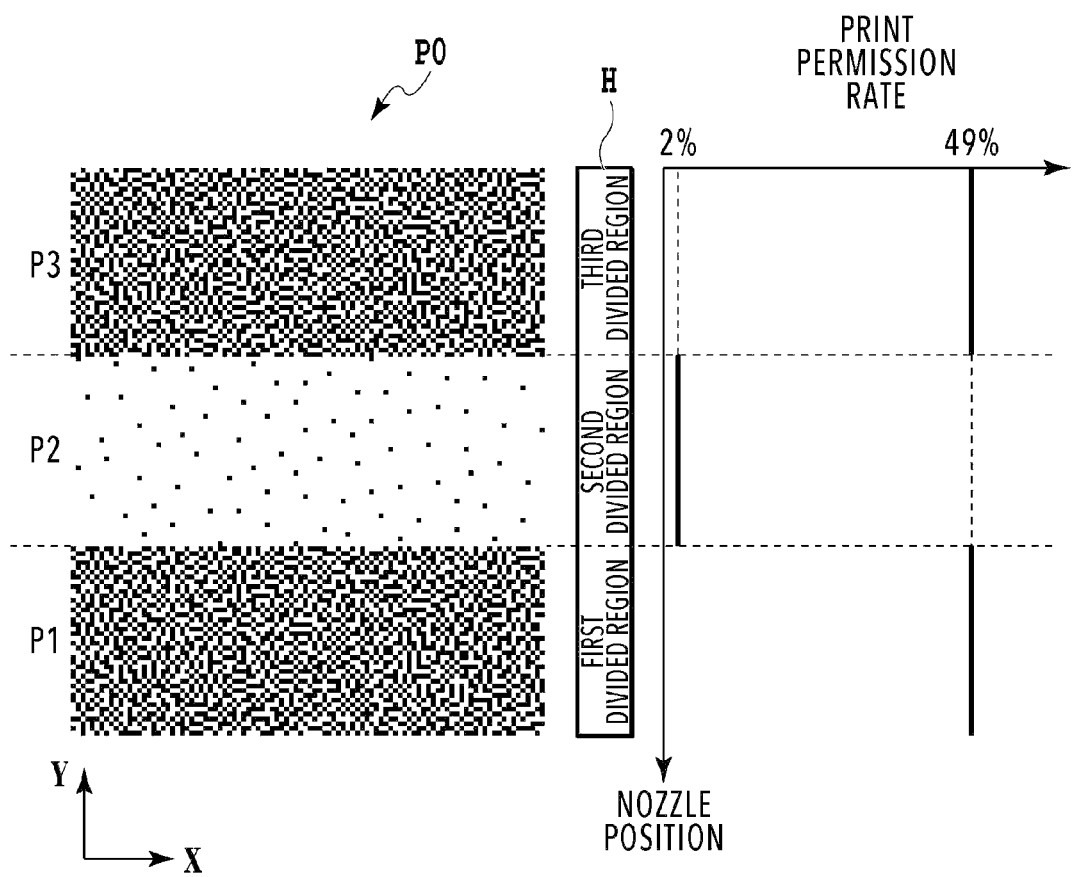
FIGS. 11A and 11B are diagrams showing a mask pattern and an ink application process used in a first embodiment.
Figure 11B:
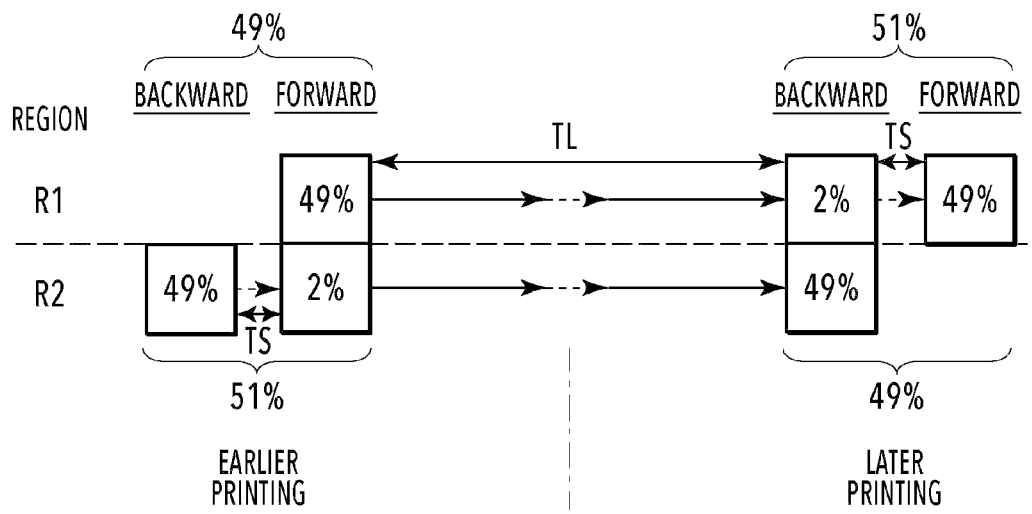

FIGS. 11A and 11B are diagrams showing a mask pattern and an ink application process used in the present embodiment for the three-pass bidirectional printing. As shown in FIG. 11A, in the present embodiment, the mask pattern P1 for the first divided region and the mask pattern P3 for the third divided region equally have a print permission rate of 49%, while the mask pattern P2 for the second divided region has a print permission rate of 2%, which is lower than that of the mask pattern P1 or P3.

In this case, as shown in FIG. 11B, for the region R1, the earlier printing (the first scan) is performed at approximately 49%, and after that, the later printing (the second and third scans) is performed at approximately 51%. For the region R2, the earlier printing (the second and third scans) is performed at approximately 51%, and after that, the later printing (the fourth scan) is performed at approximately 49%. In other words, use of the mask pattern P0 of the present embodiment allows the amount of ink applied in the earlier printing and the amount of ink applied in the later printing to be substantially equal for the region R1 and the region R2. Thus, the time TL elapsing between the earlier printing and the later printing and the ratio between the amount of ink applied in the earlier printing and the amount of ink applied in the later printing (5:5) can be maintained substantially the same between the regions R1 and R2. As a result, time difference unevenness occurring at the both ends of a printing medium can be mitigated.

(Modification 1)

In a case of using the mask pattern in FIG. 11A, the region R1 has a print permission rate of 98% for the forward scans and a print permission rate of 2% for the backward scan, and the region R2 has a print permission rate of 2% for the forward scan and a print permission rate of 98% for the backward scans. In such a case where the region R1 where most of the dots are printed in the forward scans and the region R2 where most of the dots are printed in the backward scans are adjacent to each other, the difference in the printing characteristics between the forward scan and the backward scan may become noticeable in the image. For example, in a case where dot landing positions in the X-direction are misaligned between the forward scan and the backward scan, ruled lines extending in the Y-direction result in zigzagging alternately in the ±X-directions. Also, in a case where how much satellite droplets are generated is different between the forward scan and the backward scan, an image region with a larger amount of satellite droplets and an image region with a smaller amount of satellite drops are arranged alternately in the Y-direction, and this may be perceived as density unevenness. Hereinafter, such negative effect on an image appearing due to a difference in the printing characteristics between the forward scan and the backward scan is referred to as bidirectional unevenness.

In a case of the mask pattern in FIG. 11A, the bidirectional unevenness occurs because the print permission rate for the second divided region is reduced too much relative to those for the first and third divided regions. Thus, in this modification, a mask pattern is prepared which allows both of time difference unevenness due to the difference in the ink application amount between the earlier printing and the later printing and bidirectional unevenness due to the difference in the print permission rate between the forward scan and the backward scan to fall within their acceptable ranges.

Figure 12A:
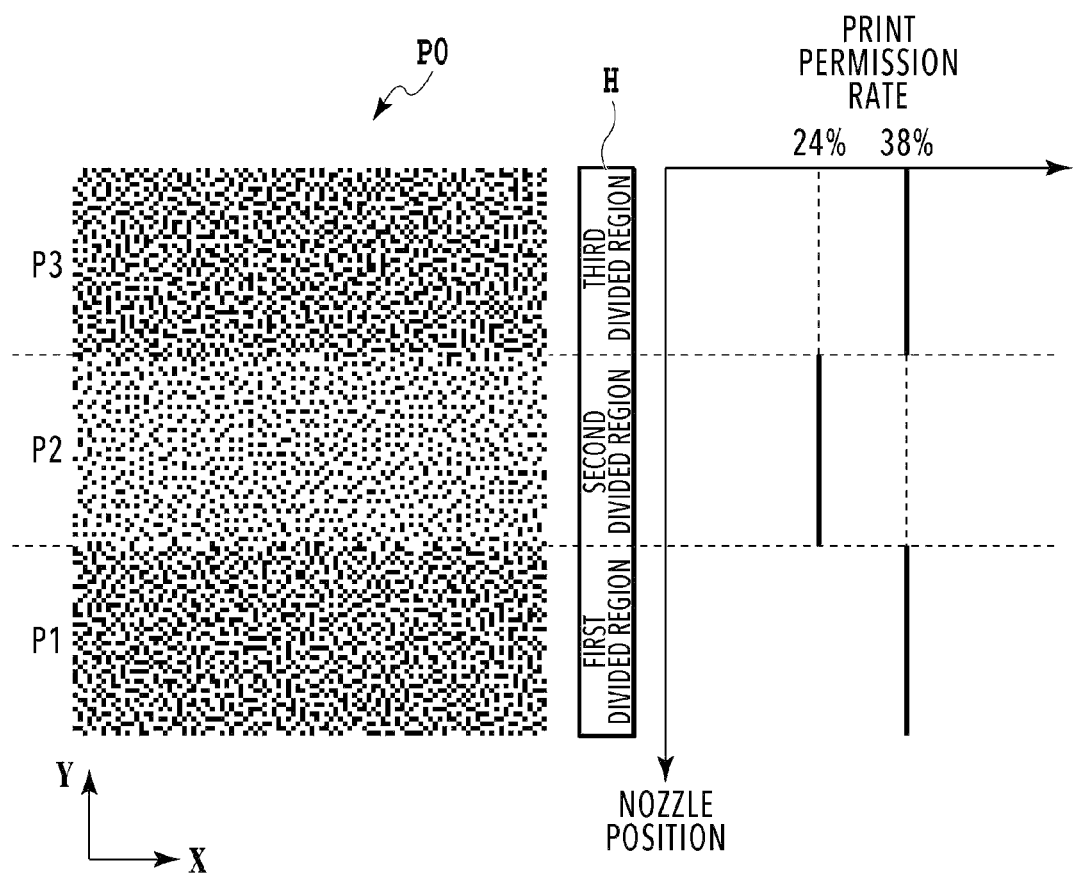
FIGS. 12A and 12B are diagrams showing a mask pattern and an ink application process used in Modification 1.
Figure 12B:
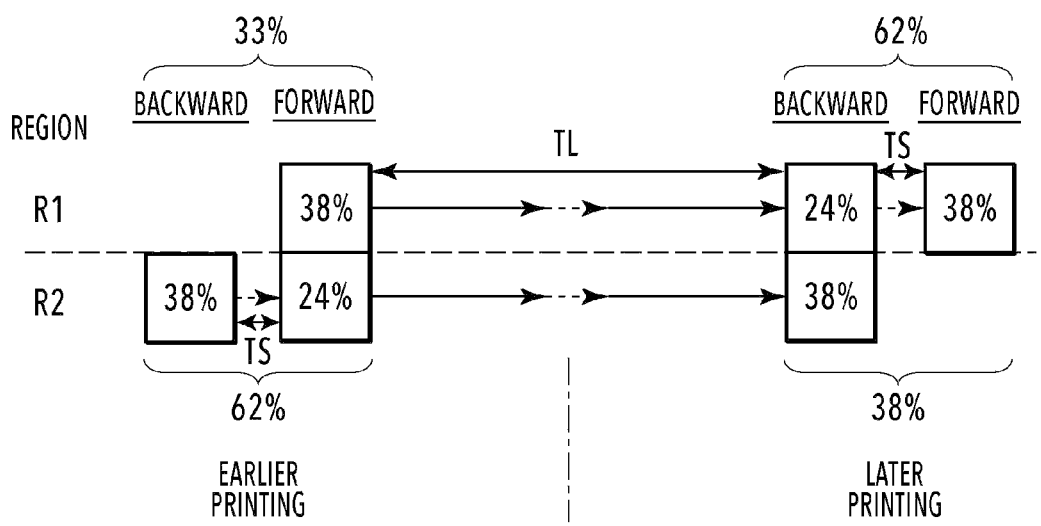

FIGS. 12A and 12B are diagrams showing a mask pattern P0 and an ink application process used in this modification for three-pass bidirectional printing. As shown in FIG. 12A, in this modification, the mask pattern P1 for the first divided region and the mask pattern P3 for the third divided region have a print permission rate of 38%, and the mask pattern P2 for the second divided region has a print permission rate of 24%.

In this case, as shown in FIG. 12B, for the region R1, the earlier printing (the first scan) is performed at approximately 38%, and after that, the later printing (the second and third scans) is performed at approximately 62%. For the region R2, the earlier printing (the second and third scans) is performed at approximately 62%, and after that, the later printing (the fourth scan) is performed at approximately 38%.

In this way, in the present modification, the mask pattern P2 for the second divided region has a lower print permission rate than the conventional mask pattern shown in FIG. 10A and a higher print permission rate than the mask pattern shown in FIG. 11A. Thus, it is possible for both of the time difference unevenness due to the difference in the ink application amount between the earlier printing and the later printing and the bidirectional unevenness due to the difference in the print permission rate between the forward scan and the backward scan to fall within their acceptable ranges.

Although the print permission rates are 38% and 24% in the example thus described, these values may be adjusted as appropriate according to the noticeability of the time difference unevenness and of the bidirectional unevenness. For example, in a case of printing a photographic image, the mask pattern in FIG. 11A may be used to prioritize mitigation of the time difference unevenness, and in a case of printing text or ruled lines, the mask pattern in FIG. 12A or 10A may be used to prioritize mitigation of the bidirectional unevenness. Also, the print permission rate may be different for each color. For example, the mask pattern in FIG. 11A may be used for color ink, and the mask pattern in FIG. 12A or 10A may be used for black ink.

(Modification 2)

In a case of using the mask pattern in FIG. 11A, error in the conveyance operation may cause a white line or a black line between image regions. Specifically, in a case where the amount of conveyance is larger than a design value, a while line is generated between adjacent image regions, and in a case where the amount of conveyance is smaller than the design value, a black line is generated.

Such a white or black line is more noticeable in a case where the difference in the print permission rate is excessively large between the adjacent divided regions. Thus, in the present modification, a mask pattern is prepared in which the print permission rate is changed in stages at a border portion between the first divided region and the second divided region and a border portion between the second divided region and the third divided region.

Figure 13A:
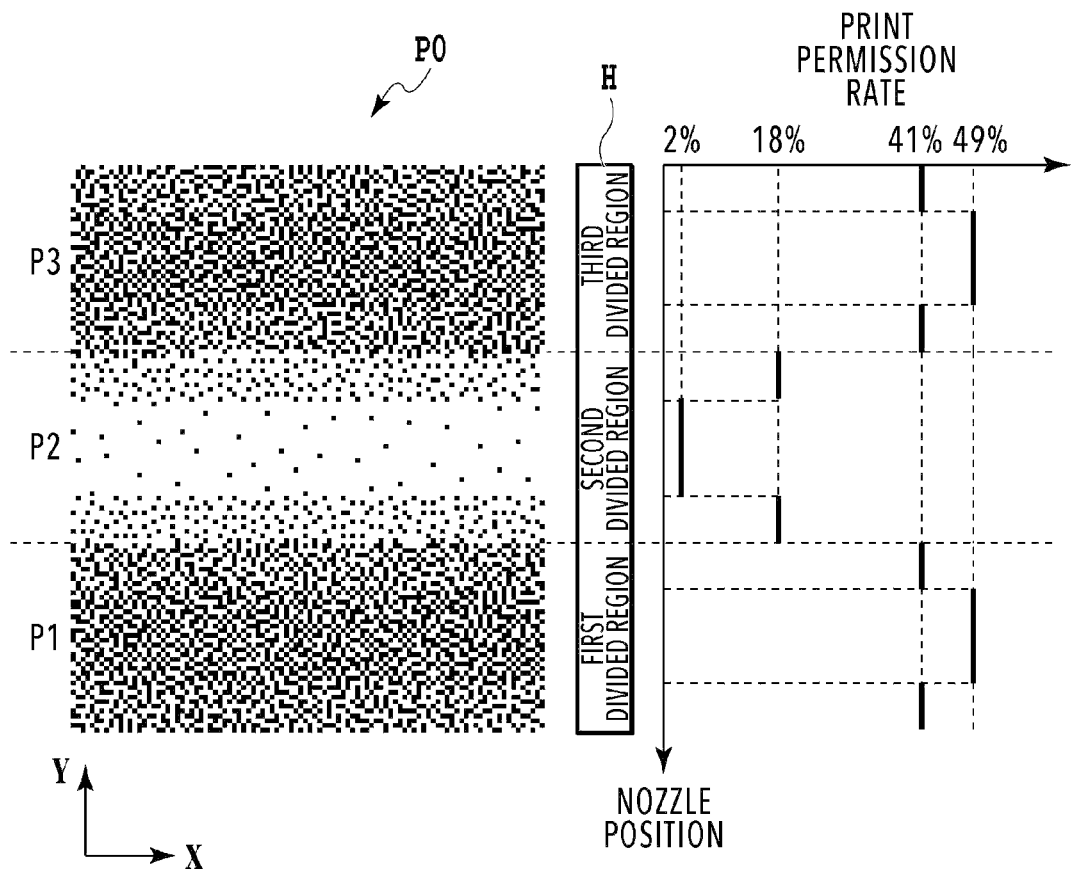
FIGS. 13A and 13B are diagrams showing a mask pattern and an ink application process used in Modification 2.
Figure 13B:
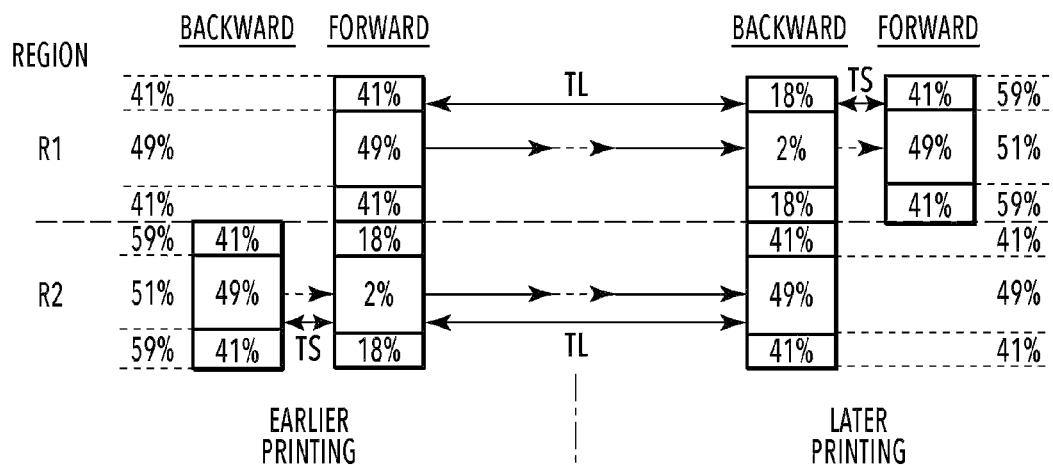

FIGS. 13A and 13B are diagrams showing a mask pattern and an ink application process used in the present modification for three-pass bidirectional printing. As shown in FIG. 13A, in the present modification, the print permission rate of the mask pattern P1 for the first divided region is changed in stages from 41% to 49% to 41% in the Y-direction. Also, the print permission rate of the mask pattern P2 for the second divided region is changed in stages from 18% to 2% to 18% in the Y-direction. Further, the print permission rate of the mask pattern P3 for the third divided region is changed in stages from 41% to 49% to 41% in the Y-direction. Thus, in the present modification, the print permission rate is set to be higher at the center portion than at the edge portions in the first and third divided regions and to be lower at the center portion than at the edge portions in the second divided region.

In this case, as shown in FIG. 13B, each of the regions R1 and R2 can be regarded as having three segment regions. For the edge portions of the region R1 in the ±Y-directions, the earlier printing (the first scan) is performed at approximately 41%, and after that, the later printing (the second and third scans) is performed at approximately 59%. For the center portion of the region R1, the earlier printing (the first scan) is performed at approximately 49%, and after that, the later printing (the second and third scans) is performed at approximately 51%. For the edge portions of the region R2 in the ±Y-direction, the earlier printing (the second and third scans) is performed at approximately 59%, and after that, the later printing (the fourth scan) is performed at approximately 41%. For the center portion of the region R2, the earlier printing (the second and third scans) is performed at approximately 51%, and after that, the later printing (the fourth scan) is performed at approximately 49%.

According to the mask pattern of the present modification, the difference in the print permission rate is 23% at the border portion between the first divided region and the second divided region and at the border portion between the second divided region and the third divided region (23%=41%−18%). Also, the difference in the print permission rate at a border where the print permission rate changes within each divided region is either 8% or 16% and is a sufficiently small value. Thus, use of the mask pattern P0 of the present modification makes it possible to mitigate time difference unevenness without generating a noticeable white or black line even in a case where the conveyance operation contains error.

Figure 14:
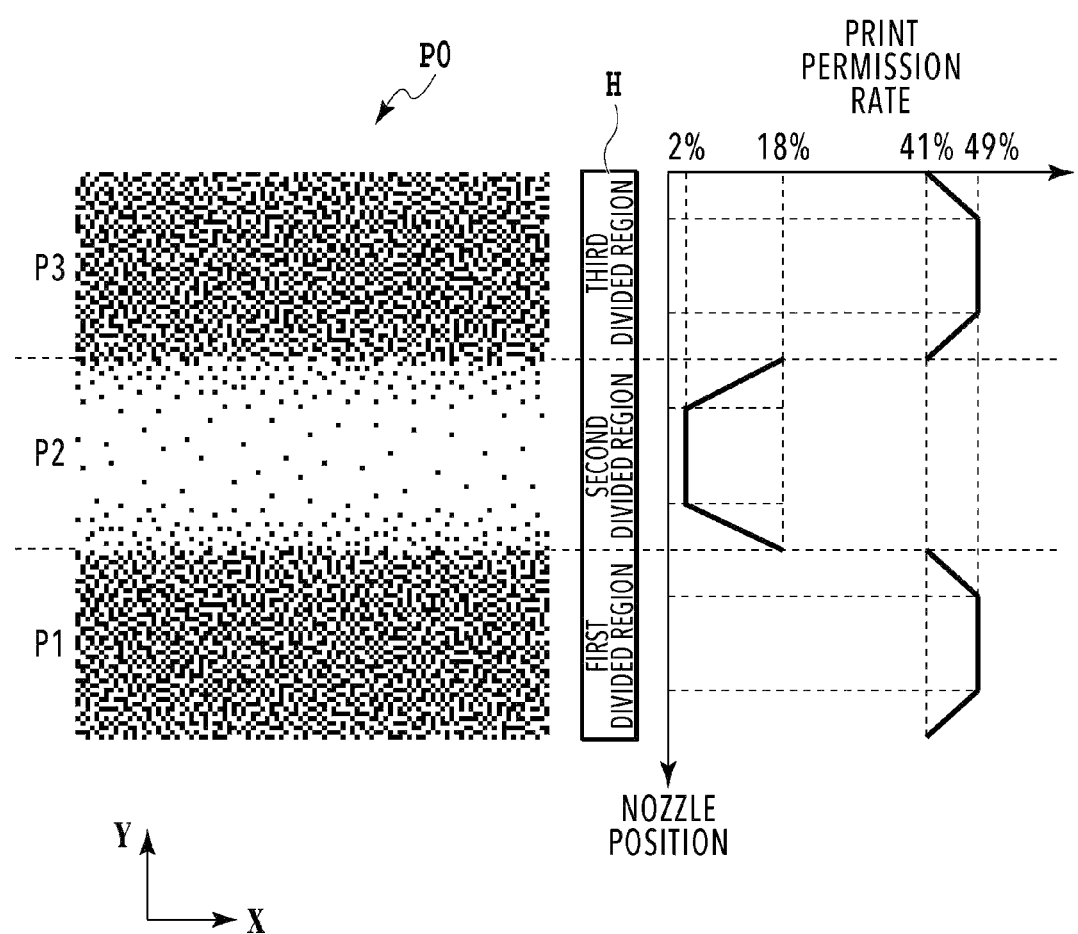
FIG. 14 is a diagram showing a different example of the mask pattern and the ink application process used in Modification 2.

FIG. 14 shows a mask pattern in which the print permission rate within each divided region is changed with a gradual slope, in comparison to the mask pattern P0 in FIG. 13A. Using such a mask pattern also makes it possible to mitigate time difference unevenness without making a noticeable white or black line, as with the mask pattern in FIG. 13A.

(Modification 3)

Figure 15A:
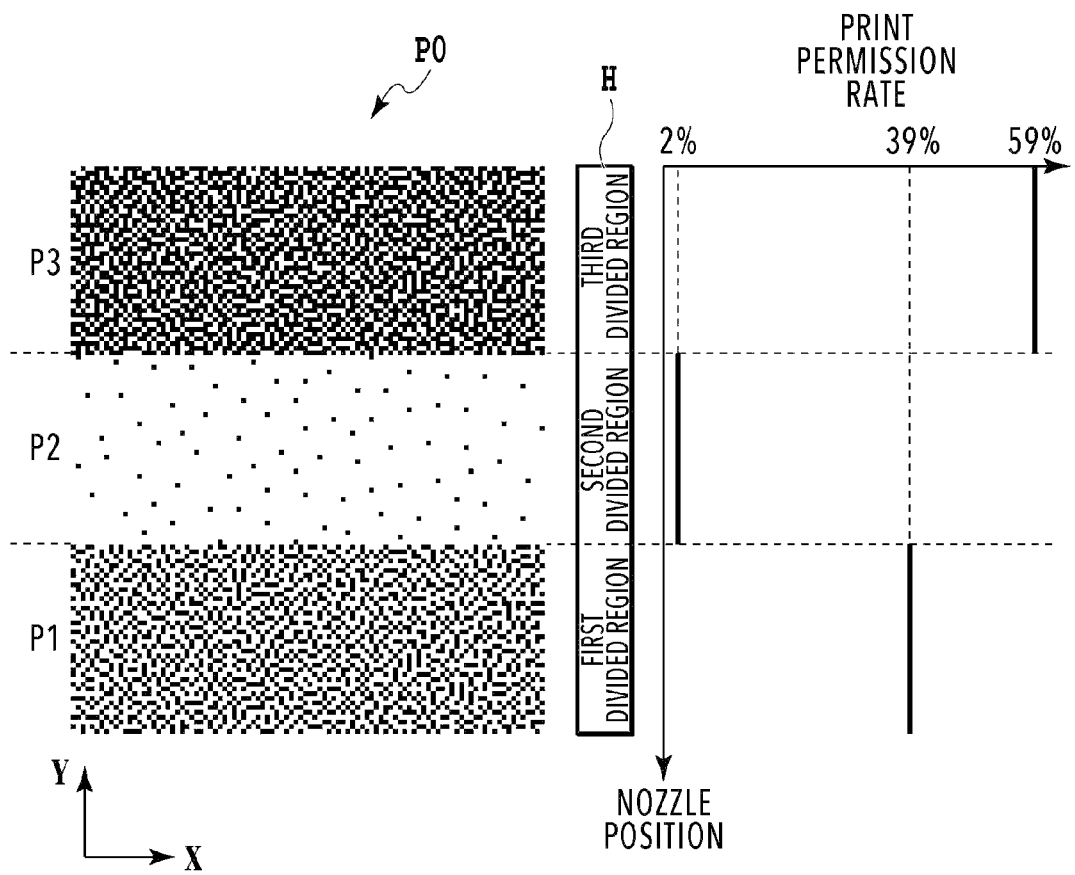
FIGS. 15A and 15B are diagrams showing a mask pattern and an ink application process used in Modification 3.
Figure 15B:
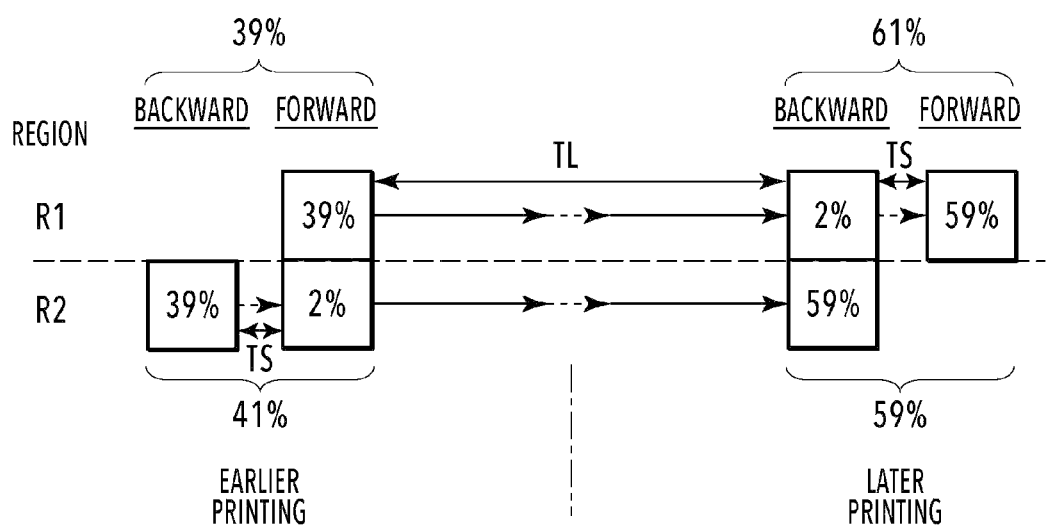

FIGS. 15A and 15B are diagrams showing a mask pattern and an ink application process used in the present modification for three-pass bidirectional printing. As shown in FIG. 15A, in this modification, the mask pattern P1 for the first divided region has a print permission rate of 39%, the mask pattern P2 for the second divided region has a print permission rate of 2%, and the mask pattern P3 for the third divided region has a print permission rate of 59%.

In this case, as shown in FIG. 15B, for the region R1, the earlier printing (the first scan) is performed at approximately 39%, and after that, the later printing (the second and third scans) is performed at approximately 61%. For the region R2, the earlier printing (the second and third scans) is performed at approximately 41%, and after that, the later printing (the fourth scan) is performed at approximately 59%. Thus, using the mask pattern P0 of the present modification, both of the regions R1 and R2 can have substantially the ratio of 4:6 as the ratio of the ink application amount in the earlier printing to the ink application amount in the later printing. In other words, the time elapsing between the earlier printing and the later printing and the ink application amount ratio between the earlier printing and the later printing (4:6) can be substantially the same between the region R1 and the region R2. Additionally, by decreasing the amount of ink applied in the first print scan and increasing the amount of ink applied in the last print scan, the present modification can also offer advantageous effects to improve the optical density and color development described using FIGS. 9B and 9C. Thus, by use of the mask pattern of the present modification, compared to the mask pattern described using FIGS. 11A and 11B, the time difference unevenness generated at both ends of a printing medium can be equally reduced, and the optical density and color development can be further improved.

Note that the ratio between the ink application amount in the earlier printing and the ink application amount in the later printing can be changed as appropriate. For example, in a case where there is a concern that too much color material existing near the surface may cause the surface layer of the printing medium to peel off or in a case where the fixation performance is to be improved, the print permission rate may be set higher for the first divided region than for the third divided region.

As thus described, in the three-pass bidirectional printing in the present embodiment, earlier printing and later printing for an edge region are defined and partitioned based on the elapsing time TL, which is the longer one of the time elapsing between the first scan and the second scan and the time elapsing between the second scan and the third scan. Then, in order for the ink application amount for the earlier printing and the ink application amount for the later printing to be substantially the same as each other, a mask pattern is used in which the print permission rate is smaller for the second divided region than for the first or third divided region. As a result, the time elapsing between the earlier printing and the later printing and the ink application amount ratio between the earlier printing and the later printing can be maintained substantially the same between unit regions to mitigate time difference unevenness occurring at the both ends of a printing medium.

Second Embodiment

The present embodiment also uses the inkjet printing apparatus described using FIGS. 1 to 3 and performs image processing described using FIGS. 4 to 5B. The present embodiment performs five-pass bidirectional printing.

Figure 16:
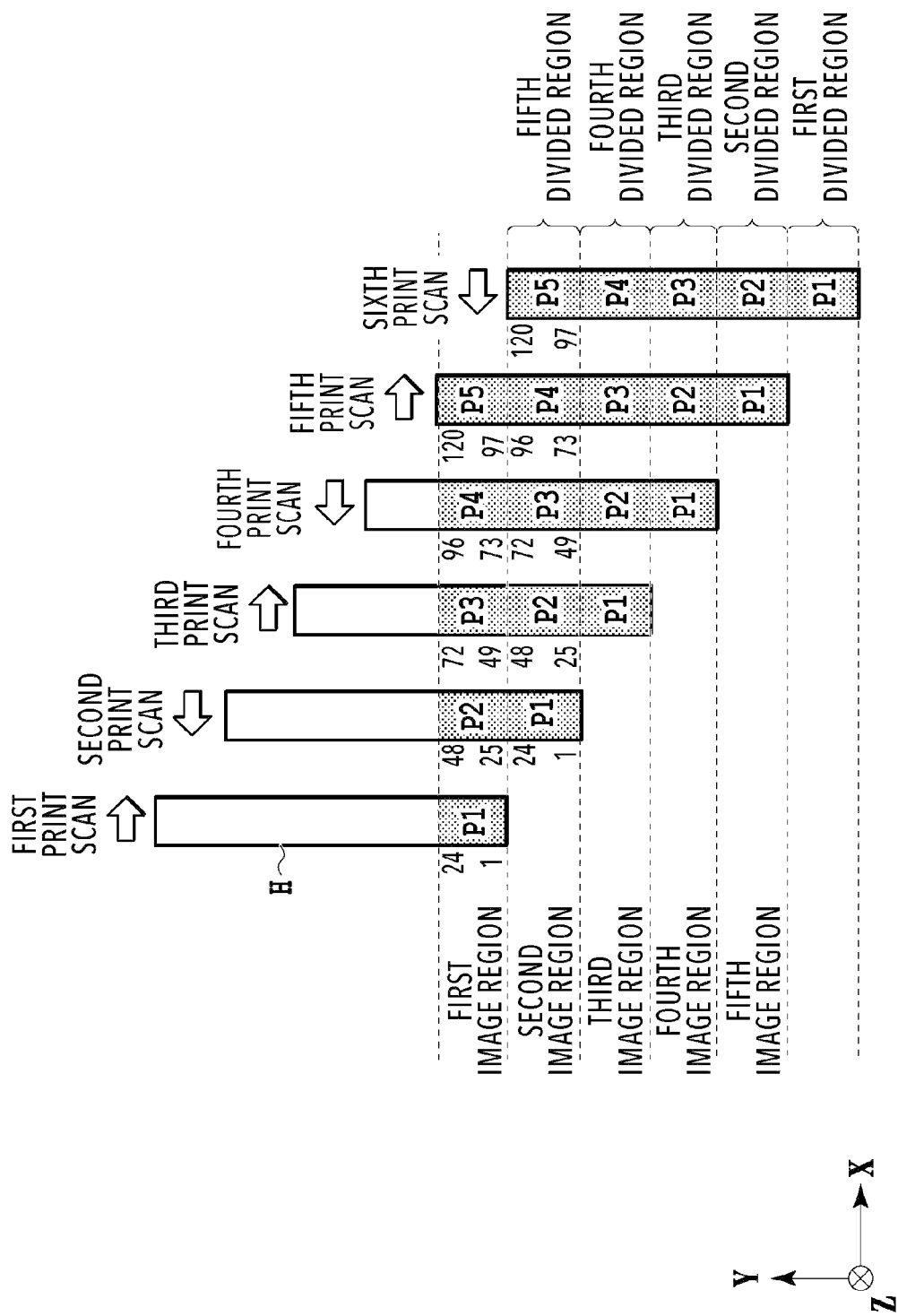
FIG. 16 is a diagram illustrating five-pass bidirectional printing.

FIG. 16 is a diagram illustrating multi-pass printing employed in the present embodiment. In a case of performing five-pass printing, 120 nozzles arranged on a nozzle row are divided into five regions each with 24 nozzles, and mask patterns P1 to P5 having a complementary relation with one another are assigned to the respective divided regions. The present embodiment too determines whether to print or not to print a dot in each pixel by performing a logical AND between the print data on each pixel determined by the index expansion processing and the mask patterns defining whether a dot is permitted (1) or not permitted (0) to be printed.

In a first print scan, the first divided region of the print head H is used to perform a print scan in the forward direction (the +X-direction). As a result, a dot pattern in accordance with the mask pattern P1 is printed on a first image region on the printing medium P. After the first scan is complete, the printing medium P is conveyed in the +Y-direction by a distance corresponding to the divided region (a distance corresponding to 24 nozzles).

In a second print scan, the first divided region and the second divided region of the print head H are used to perform a print scan in the backward direction (the −X-direction). As a result, a dot pattern in accordance with the mask pattern P1 is printed on a second image region on the printing medium P. Also, a dot pattern in accordance with the mask pattern P2 is printed on the first image region, overlaying on the dot pattern printed in accordance with the mask pattern P1. After the second scan is complete, the printing medium P is conveyed in the +Y-direction by a distance corresponding to 24 pixels.

In a third print scan, the first to third divided regions of the print head H are used to perform a print scan in the forward direction (the +X-direction). Also, a dot pattern in accordance with the mask pattern P1 is printed on a third image region on the printing medium P. In addition, a dot pattern in accordance with the mask pattern P2 is printed on the second image region, overlaying on the dot pattern printed in accordance with the mask pattern P1. A dot pattern in accordance with the mask pattern P3 is printed on the first image region, overlaying on the dot patterns printed in accordance with the mask patterns P1 and P2.

In a fourth print scan, the first to fourth divided regions of the print head H are used to perform a print scan in the backward direction (the −X-direction). As a result, a dot pattern in accordance with the mask pattern P1 is printed on a fourth image region on the printing medium P. Also, a dot pattern in accordance with the mask pattern P2 is printed on the third image region on the medium P, overlaying on the dot pattern printed in accordance with the mask pattern P1. A dot pattern in accordance with the mask pattern P3 is printed on the second image region on the printing medium, overlaying on the dot patterns printed in accordance with the mask patterns P1 and P2. A dot pattern in accordance with the mask pattern P4 is printed on the first image region on the printing medium, overlaying on the dot patterns printed in accordance with the mask patterns P1 to P3.

In a fifth print scan, the first to fifth divided regions of the print head H are used to perform a print scan in the forward direction (the +X-direction). As a result, a dot pattern in accordance with the mask pattern P1 is printed on a fifth image region on the printing medium P. Also, a dot pattern in accordance with the mask pattern P2 is printed on the fourth image region on the printing medium P, overlaying on the dot pattern printed in accordance with the mask pattern P1. A dot pattern in accordance with the mask pattern P3 is printed on the third image region on the printing medium, overlaying on the dot patterns printed in accordance with the mask patterns P1 and P2. A dot pattern in accordance with the mask pattern P4 is printed on the second image region on the printing medium, overlaying on the dot patterns printed in accordance with the mask patterns P1 to P3. A dot pattern in accordance with the mask pattern P5 is printed on the first image region on the printing medium, overlaying on the dot patterns printed in accordance with the mask patterns P1 to P4.

Since the mask patterns P1 to P5 have a complementary relation with one another, once the fifth print scan is completed, an image in the first image region is complete. After the fifth print scan is complete, the printing medium P is conveyed in the +Y-direction by a distance corresponding to 24 pixels.

After that, a print scan in the backward direction and a print scan in the forward direction are alternately performed using the first to fifth divided regions of the print head H, with the conveyance operation by a distance corresponding to 24 pixels being performed between the print scans. Every time a print scan is performed, an image in one image region is completed.

Figure 17A:
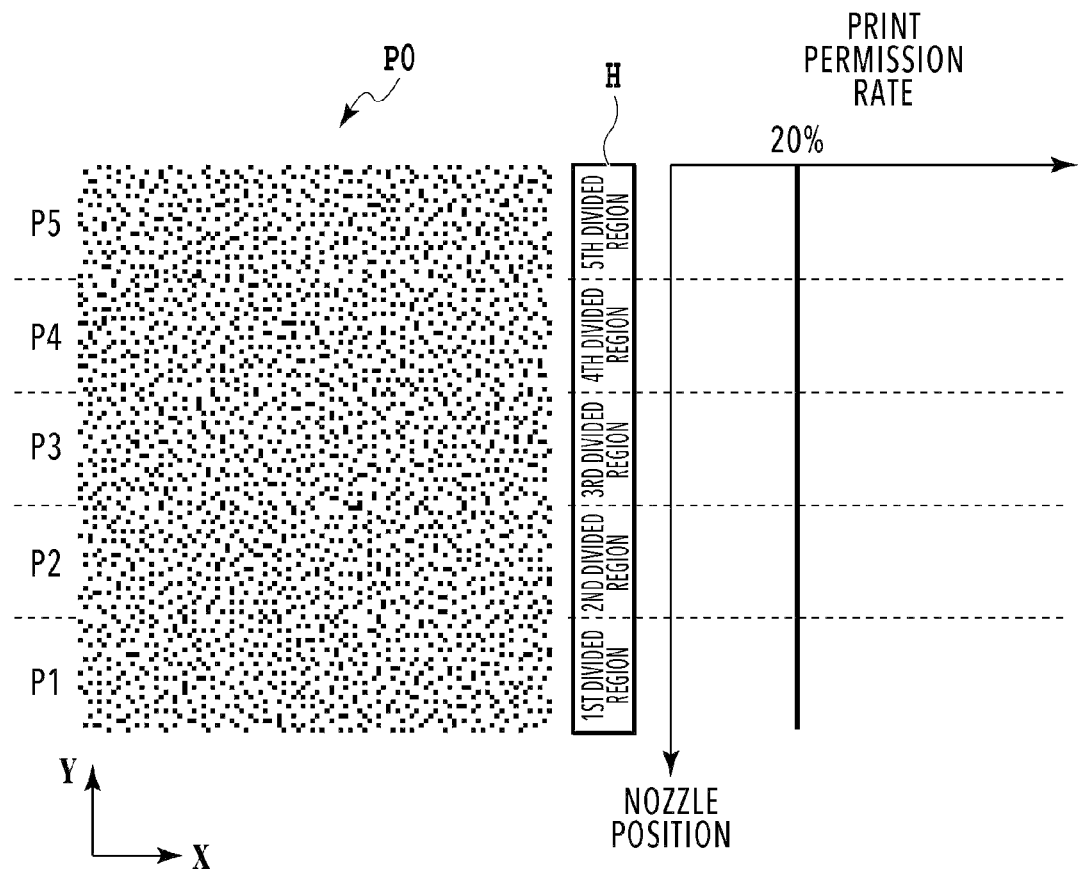
FIGS. 17A and 17B are diagrams showing a mask pattern typically used in five-pass bidirectional printing.
Figure 17B:
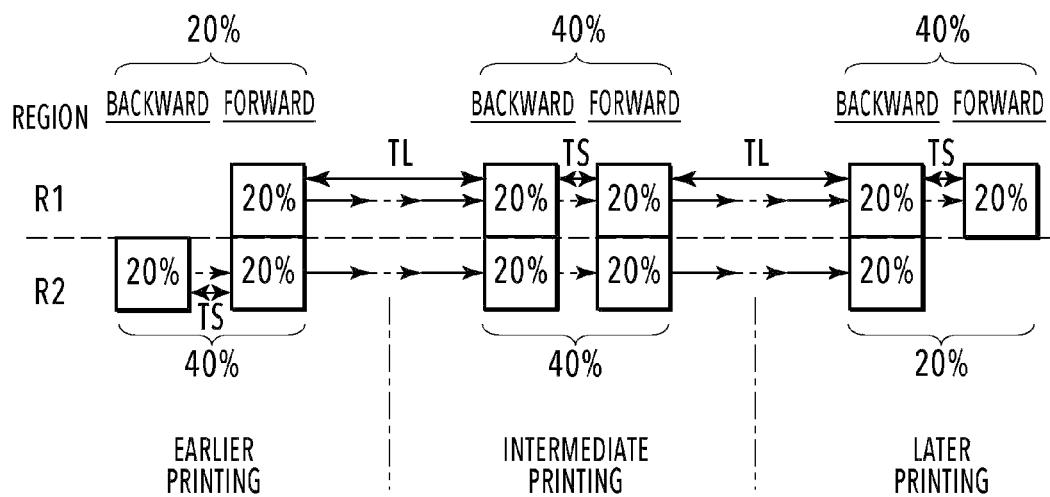

FIGS. 17A and 17B are diagrams illustrating a mask pattern typically used for five-pass printing. FIG. 17A shows, on the left, a typical mask pattern P0 used by an Odd or Even row of any given nozzle row. Shown to the right of the mask pattern is the print permission rate for each of the pixel regions arranged in the Y-direction. In the typical mask pattern P0 used for five-pass printing, the print permission rates for the pixel regions arranged in the Y-direction are, as shown in FIG. 17A, nearly equal (20%=100%/5).

FIG. 17B is a diagram comparing the region R1 located at the left edge of the first image region and the region R2 located at the left edge of the second image region, in terms of ink application process using the mask pattern P0 in FIG. 17A. In the five-pass bidirectional printing, for the region R1, elapsing time TL elapses from the ink application by the first print scan to the ink application by the second print scan. Then, elapsing time TS elapses from the ink application by the second print scan to the ink application by the third print scan. Also, the elapsing time TL elapses from the ink application by the third print scan to the ink application by the fourth print scan. Further, the elapsing time TS elapses from the ink application by the fourth print scan to the ink application by the fifth print scan. Thus, for the region R1, the longer time TL elapses from the first ink application to the second ink application and from the third ink application to the fourth ink application, while the shorter time TS elapses from the second ink application to the third ink application and from the fourth ink application to the fifth ink application.

Meanwhile, for the region R2, the elapsing time TS elapses from the ink application by the second print scan to the ink application by the third print scan. Then, the elapsing time TL elapses from the ink application by the third print scan to the ink application by the fourth print scan. Also, the elapsing time TS elapses from the ink application by the fourth print scan to the ink application by the fifth print scan. Further, the elapsing time TL elapses from the ink application by the fifth print scan to the ink application by the sixth print scan. Thus, for the region R2, the shorter time TS elapses from the first ink application to the second ink application and from the third ink application to the fourth ink application, while the longer time TL elapses from the second ink application to the third ink application and from the fourth ink application to the fifth ink application.

FIG. 17B shows the timings at which ink is applied to the regions R1, R2 based on the longer elapsing time TL. In FIG. 17B, print scans performed before two periods of the elapsing time TL are denoted as earlier printing, print scans performed between the two periods of elapsing time TL are denoted as intermediate printing, and print scans performed after the two periods of elapsing time TL are denoted as later printing. Specifically, for the region R1, the printing in accordance with the mask pattern P1 is the earlier printing, the printing in accordance with the mask patterns P2 and P3 is the intermediate printing, and the printing in accordance with the mask patterns P4 and P5 is the later printing. For the region R2, the printing in accordance with the mask patterns P1 and P2 is the earlier printing, the printing in accordance with the mask patterns P3 and P4 is the intermediate printing, and the printing in accordance with the mask pattern P5 is the later printing.

In this case, for the region R1, the earlier printing (the first scan) is first performed at approximately 20%, the intermediate printing (the second and third scans) is then performed at approximately 40%, and the later printing (the fourth and fifth scans) is then performed at approximately 40%. For the region R2, the earlier printing (the second and third scans) is performed at approximately 40%, the intermediate printing (the fourth and fifth scans) is then performed at approximately 40%, and the later printing (the sixth scan) is performed at approximately 20%. In other words, a large amount of the ink for the region R1 is applied by the intermediate printing and the later printing, and a large amount of the ink for the region R2 is applied by the earlier printing and the intermediate printing. As a result, time difference unevenness may be perceived at the both ends of the printing medium.

Figure 18A:
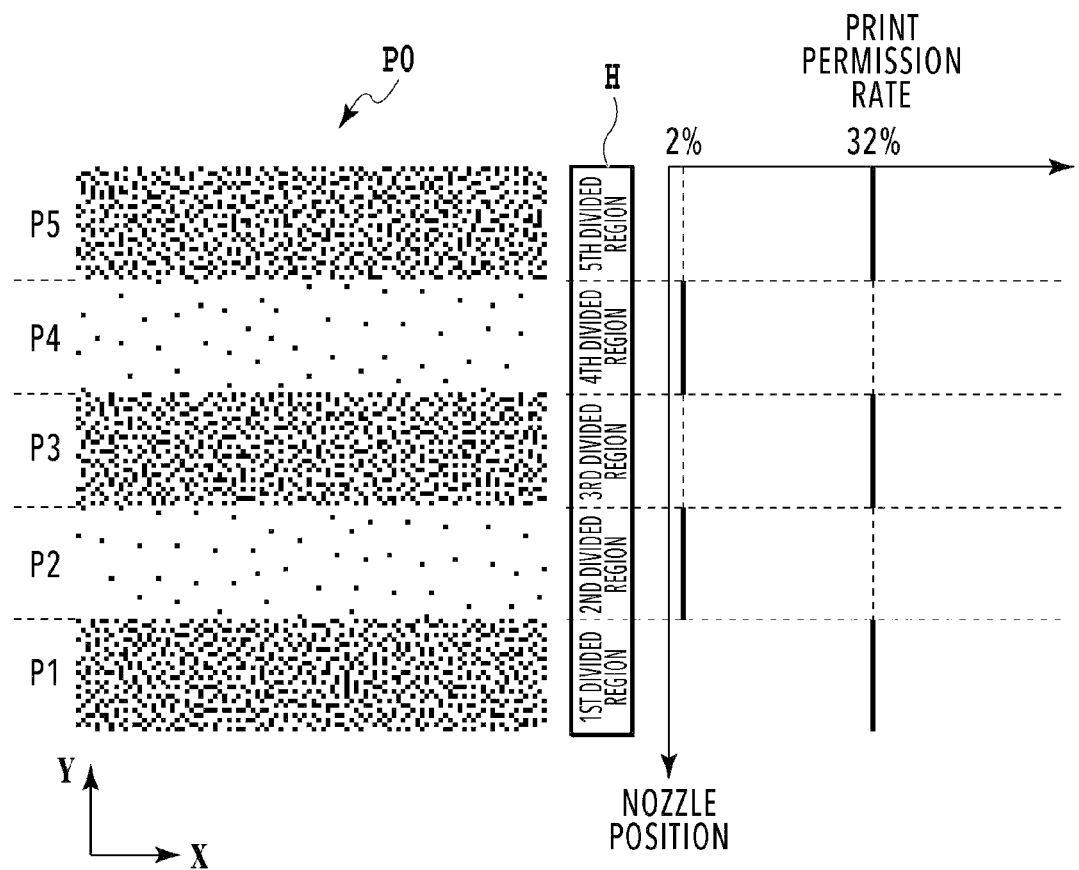
FIGS. 18A and 18B are diagrams showing a mask pattern and an ink application process used in a second embodiment.
Figure 18B:
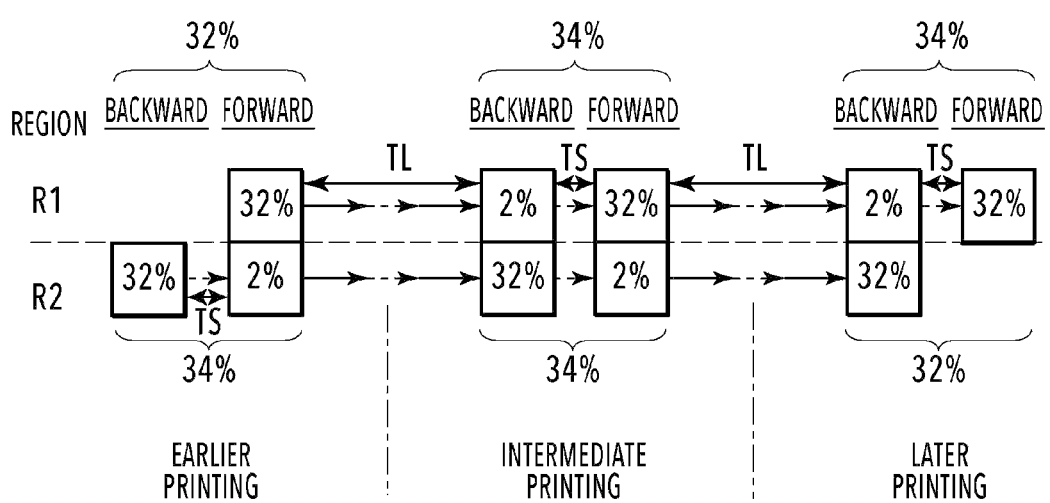

FIGS. 18A and 18B are diagrams showing a mask pattern and an ink application process used in the present embodiment for five-pass bidirectional printing. As shown in FIG. 18A, in the present embodiment, the mask pattern P1 for the first divided region, the mask pattern P3 for the third divided region, and the mask pattern P5 for the fifth divided region have a print permission rate of 32%. By contrast, the mask pattern P2 for the second divided region and the mask pattern P4 for the fourth divided region have a print permission rate of 2%, which is lower than those of the mask patterns P1, P3, and P5.

In this case, as shown in FIG. 18B, for the region R1, the earlier printing (the first scan) is first performed at approximately 32%, the intermediate printing (the second and third scans) is then performed at approximately 34%, and the later printing (the fourth and fifth scans) is performed at approximately 34%. For the region R2, the earlier printing (the second and third scans) is performed at approximately 34%, the intermediate printing (the fourth and fifth scans) is then performed at approximately 34%, and the later printing (the sixth scan) is performed at approximately 32%. Thus, use of the mask pattern of the present embodiment allows the amounts of ink applied by the earlier printing, the intermediate printing, and the later printing to be subsequently equal in the regions R1 and R2. Thus, the elapsing time TL between the earlier printing and the intermediate printing and between the intermediate printing and the later printing and the ratio between the amounts of ink applied by the earlier printing, the intermediate printing, and the later printing (3:3:3) can be maintained substantially the same between the region R1 and the region R2. As a result, time difference unevenness occurring at the both ends of a printing medium can be mitigated.

Note that the print permission rates for the divided regions can be changed as appropriate in the present embodiment as well. For example, the mask pattern in FIG. 18A may be used for color ink to prioritize mitigation of the time difference unevenness, and the mask pattern in FIG. 17A may be used for black ink to prioritize mitigation of the bidirectional unevenness.

Third Embodiment

The present embodiment also uses the inkjet printing apparatus described using FIGS. 1 to 3 and performs image processing described using FIGS. 4 to 5B. The present embodiment performs four-pass bidirectional printing.

Figure 19:
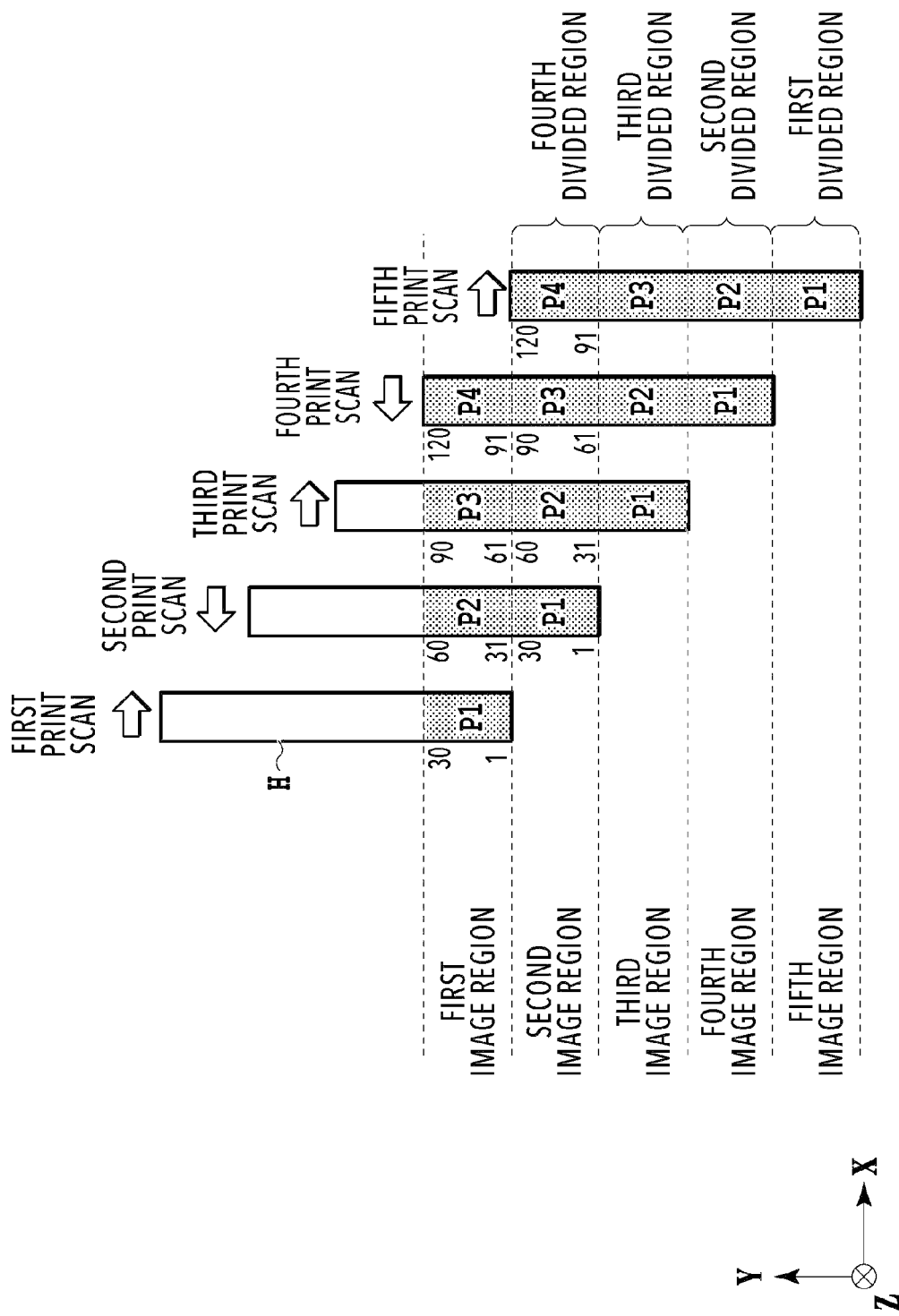
FIG. 19 is a diagram illustrating four-pass bidirectional printing.

FIG. 19 is a diagram illustrating multi-pass printing employed in the present embodiment. In a case of performing four-pass printing, 120 nozzles arranged on an Odd or Even row of any given nozzle row are divided into four regions each with 30 nozzles, and mask patterns having a complementary relation with one another are assigned to the respective divided regions. FIG. 19 shows the mask patterns P1 to P4 assigned to the respective divided regions from the most upstream side in the Y-direction. The present embodiment too determines whether to print (1) or not to print (0) a dot in each pixel by performing a logical AND between the print data on each pixel determined by the index expansion processing and the mask patterns defining whether a dot is permitted (1) or not permitted (0) to be printed.

Figure 20A:
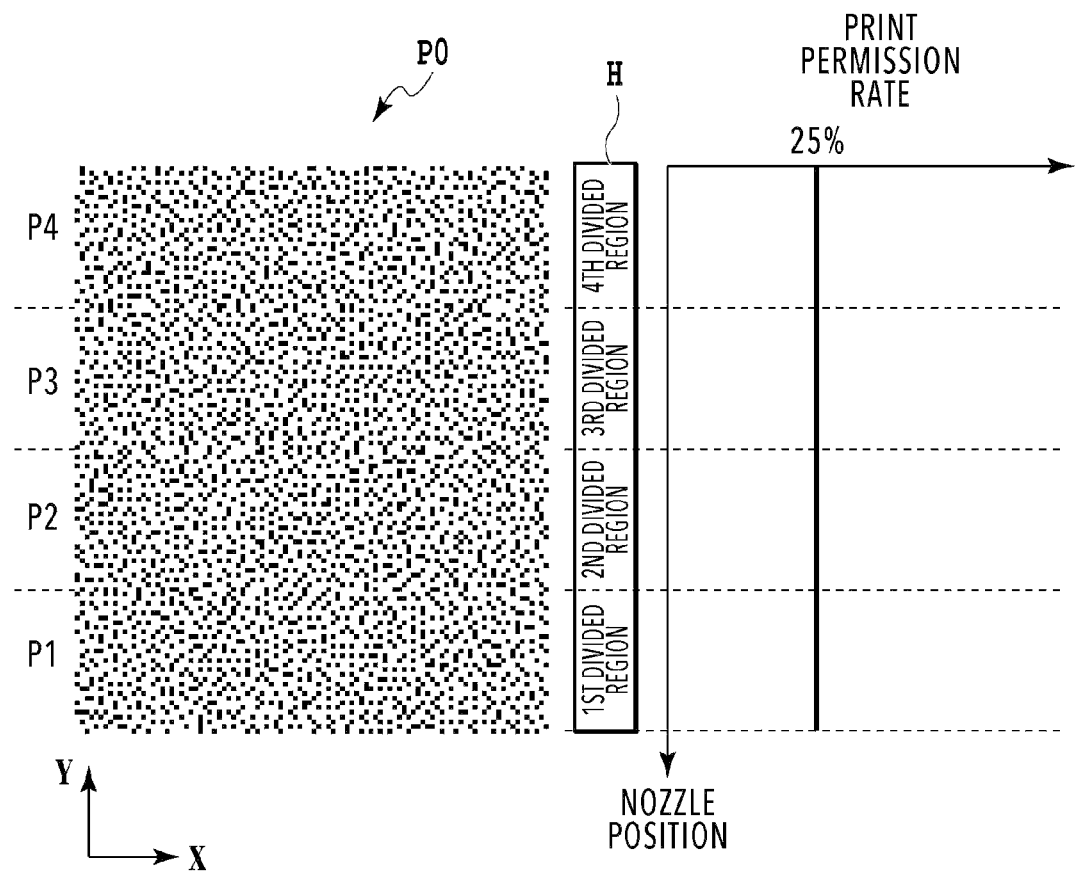
FIGS. 20A and 20B are diagrams showing a mask pattern typically used in four-pass bidirectional printing.
Figure 20B:
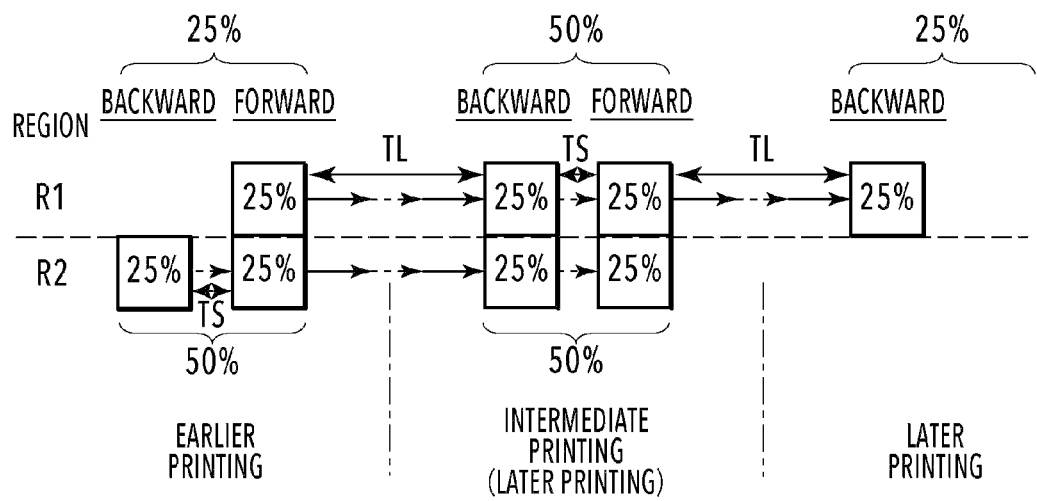

FIGS. 20A and 20B are diagrams illustrating a mask pattern typically used for four-pass printing. FIG. 20A shows, on the left, a typical mask pattern P0 used by an Odd or Even row of any given nozzle row. Shown to the right of the mask pattern is the print permission rate for each of the pixel regions arranged in the Y-direction. In the typical mask pattern P0 used for four-pass printing, the print permission rates for the pixel regions arranged in the Y-direction are, as shown in FIG. 20A, nearly equal (25%=100%/4).

FIG. 20B is a diagram comparing the region R1 located at the left edge of the first image region and the region R2 located at the left edge of the second image region, in terms of the ink application process using the mask pattern P0 in FIG. 20A. In the four-pass bidirectional printing, for the region R1, elapsing time TL elapses from the ink application by the first print scan to the ink application by the second print scan. Then, elapsing time TS elapses from the ink application by the second print scan to the ink application by the third print scan. Also, the elapsing time TL elapses from the ink application by the third print scan to the ink application by the fourth print scan. Thus, for the region R1, the longer time TL elapses from the first ink application to the second ink application and from the third ink application to the fourth ink application, and the shorter time TS elapses from the second ink application to the third ink application.

For the region R2, the elapsing time TS elapses from the ink application by the second print scan to the ink application by the third print scan. Then, the elapsing time TL elapses from the ink application by the third print scan to the ink application by the fourth print scan. Also, the elapsing time TS elapses from the ink application by the fourth print scan to the ink application by the fifth print scan. Thus, for the region R2, the shorter time TS elapses from the first ink application to the second ink application and from the third ink application to the fourth ink application, and the longer time TL elapses from the second ink application to the third ink application.

FIG. 20B shows the timings at which ink is applied to the regions R1, R2 based on the elapsing time TL. In this case, for the region R1, the printing in accordance with the mask pattern P1 is the earlier printing, the printing in accordance with the mask patterns P2 and P3 is the intermediate printing, and the printing in accordance with the mask pattern P4 is the later printing. For the region R2, the printing in accordance with the mask patterns P1 and P2 is the earlier printing, the printing in accordance with the mask patterns P3 and P4 is the intermediate printing, and there is no later printing. Thus, the intermediate printing is virtually the later printing.

In this case, for the region R1, the earlier printing (the first scan) is first performed at approximately 25%, the intermediate printing (the second and third scans) is then performed at approximately 50%, and the later printing (the fourth scan) is then performed at approximately 25%. For the region R2, the earlier printing (the second and third scans) is performed at approximately 50%, the intermediate printing (the fourth and fifth scans) is then performed at approximately 50%, and the later printing is not performed. In other words, for the region R1, ink is applied in three stages, namely the earlier printing, the intermediate printing, and the later printing, and for the region R2, ink is applied in two stages, namely the earlier printing and the intermediate printing. In bidirectional multi-pass printing with an even number of passes, the number of times ink is applied is different between adjacent regions (R1 and R2) in such a case where the ink application timings are assigned and partitioned based on the longer elapsing time TL. As a result, time difference unevenness may be perceived at the both ends of a printing medium.

Figure 21A:
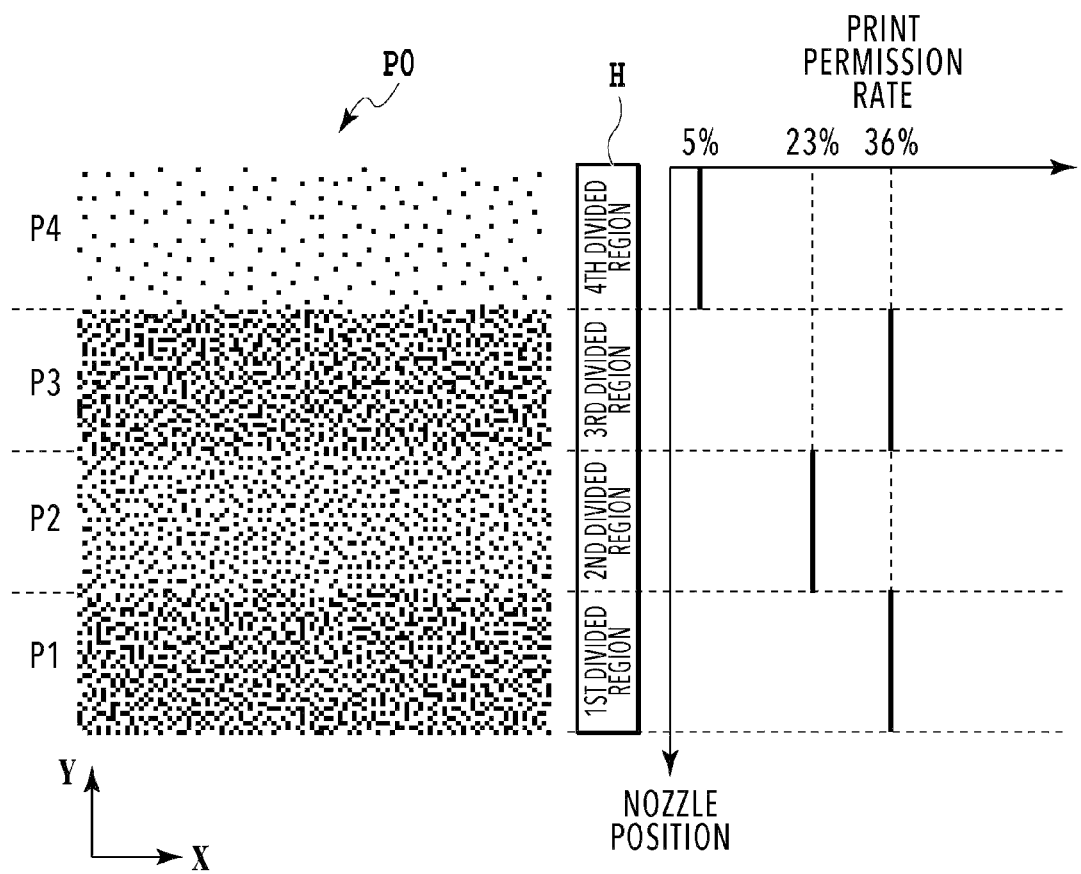
FIGS. 21A and 21B are diagrams showing a mask pattern and an ink application process used in a third embodiment.
Figure 21B:
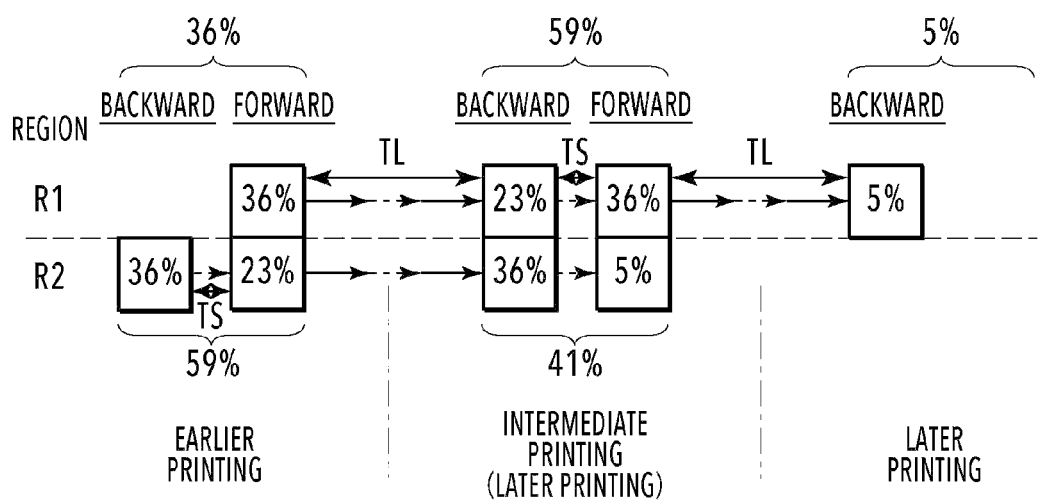

FIGS. 21A and 21B are diagrams showing a mask pattern and an ink application process used in the present embodiment for four-pass bidirectional printing. As shown in FIG. 21A, in the present embodiment, the mask pattern P1 for the first divided region and the mask pattern P3 for the third divided region have a print permission rate of 36%. Then, the mask pattern P2 for the second divided region has a print permission rate of 23%, which is lower than those for the first and third divided regions, and the mask pattern P4 for the fourth divided region has a print permission rate of 5%, which is even lower.

In this case, as shown in FIG. 21B, for the region R1, the earlier printing (the first scan) is first performed at approximately 36%, the intermediate printing (the second and third scans) is then performed at approximately 59%, and the later printing (the fourth scan) is performed at approximately 5%. In other words, a majority of the ink is applied in the earlier printing and the intermediate printing. For the region R2, the earlier printing (the second and third scans) is performed at approximately 59%, the intermediate printing (the fourth and fifth scans) is then performed at approximately 41%, and the later printing is not performed.

Since the print permission rate for the fourth divided region is thus decreased in the present embodiment, the amount of ink applied to the region R1 in the later printing is reduced. Consequently, the number of times ink is applied is substantially two times for both of the region R1 and the region R2. Thus, substantially the same situation as the first embodiment that performs three-pass bidirectional printing can be created. Additionally, since the print permission rate is smaller for the second divided region than for the first or third divided region like in the first embodiment, time difference unevenness occurring at the both ends of the printing medium can be mitigated like in the first embodiment.

(Modification)

Figure 22A:
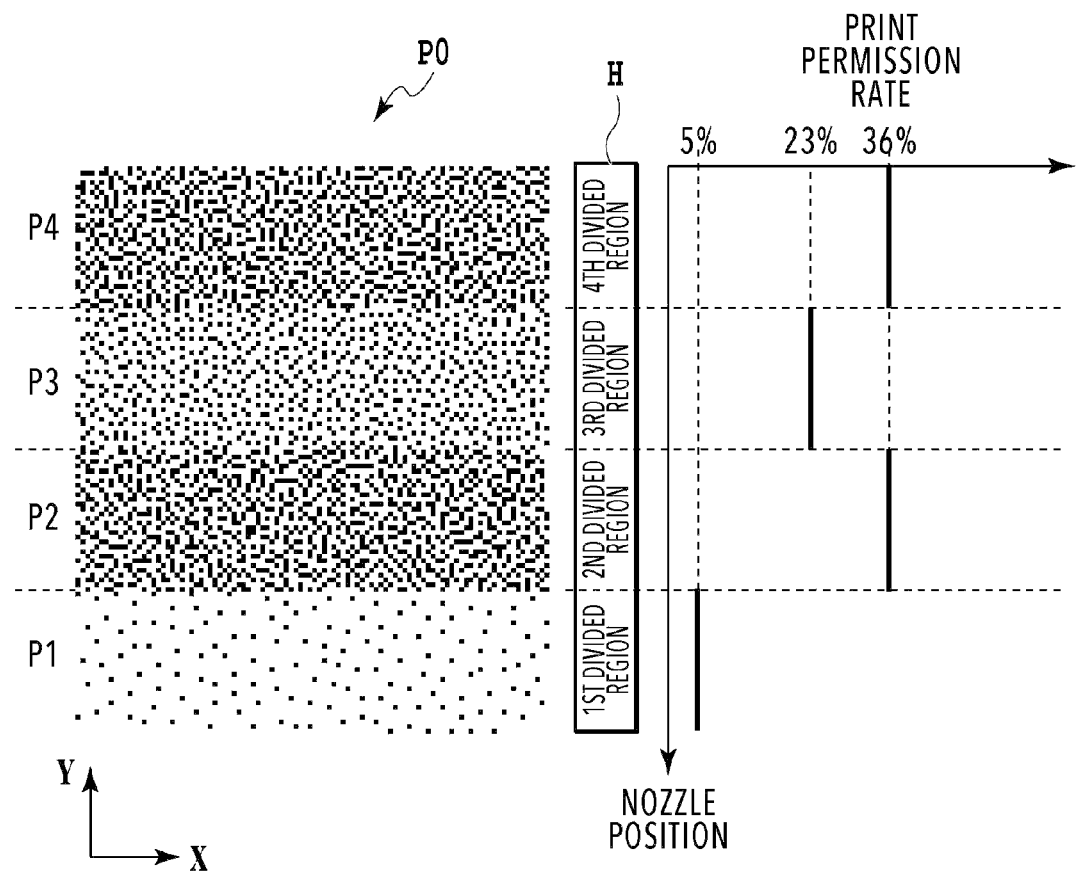
FIGS. 22A and 22B are diagrams showing a different example of the mask pattern and the ink application process used in the third embodiment.
Figure 22B:
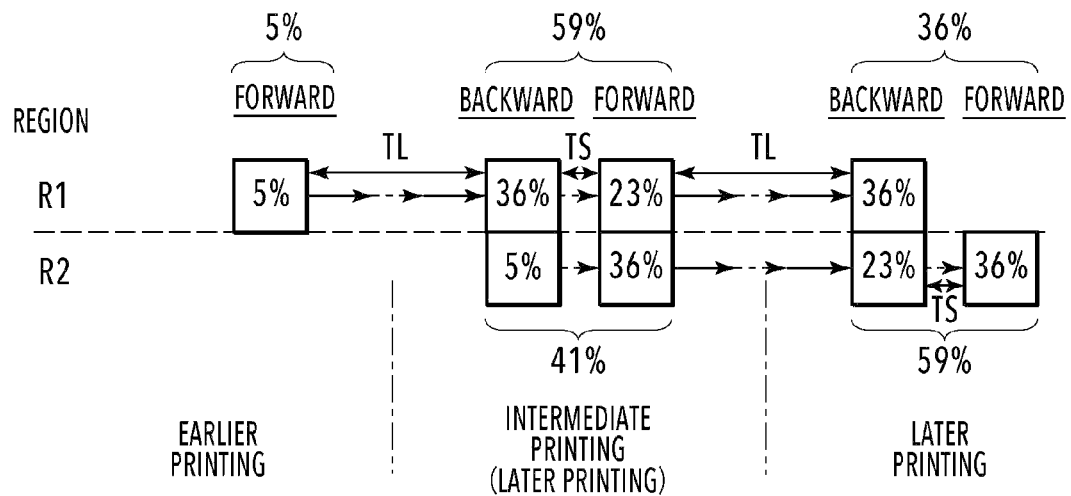

FIGS. 22A and 22B are diagrams showing a modification of a mask pattern that can be used in the third embodiment. In this modification, the mask pattern P2 for the second divided region and the mask pattern P4 for the fourth divided region have a print permission rate of 36%. Also, the mask pattern P3 for the third divided region has a print permission rate of 23%, which is lower than that for the second or fourth divided region, and the mask pattern P1 for the first divided region has a print permission rate of 5%, which is even lower.

In this case, as shown in FIG. 22B, for the region R1, the earlier printing (the first scan) is first performed at approximately 5%, the intermediate printing (the second and third scans) is then performed at approximately 59%, and the later printing (the fourth scan) is performed at approximately 36%. In other words, a majority of the ink is applied in two stages of printing, namely the intermediate printing and the later printing. For the region R2, the earlier printing is not performed, the intermediate printing (the second and third scans) is then performed at approximately 41%, and the later printing (the fourth and fifth scans) is then performed at approximately 59%.

Since the print permission rate for the first divided region is thus decreased in the present modification, the amount of ink applied to the region R1 in the earlier printing is reduced. Consequently, the number of times ink is applied is substantially two times for both of the region R1 and the region R2. Thus, substantially the same situation as the first embodiment that performs three-pass bidirectional printing can be created. Additionally, since the print permission rate is smaller for the third divided region than for the second or fourth divided region like in the first embodiment, time difference unevenness occurring at the both ends of the printing medium can be mitigated like in the first embodiment.

Note that the print permission rates for the divided regions can be changed as appropriate in the present embodiment as well. For example, the mask pattern in FIG. 21A may be used for color ink, and the mask pattern in FIG. 22A may be used for black ink.

Other Embodiments

The above embodiments describe three-pass, four-pass, and five-pass printing as examples of multi-pass printing. However, the printing methods described above are also applicable to multi-pass printing with more passes. For example, for multi-pass printing with an odd number of passes, i.e., 2N+1 times of passes where N is a natural number, control may be performed such that the amount of ink applied to a unit region, like the region R1 or R2, by an even-numbered print scan may be less than the amount of ink applied to the unit region by an odd-numbered print scan. To that end, a mask pattern may be used in which the print permission rate is set lower for a divided region corresponding to an even-numbered print scan for a unit region than for a divided region corresponding to an odd-numbered print scan for the unit region. This allows the ratio between the amounts of ink applied in different printing stages, such as earlier printing and later printing, partitioned by the elapsing time TL to be maintained substantially the same between unit regions and thereby allows mitigation of time difference unevenness.

For multi-pass printing with an even number of passes, i.e., 2N times of passes where N is a natural number, control may be performed such that the amount of ink applied to a unit region by the first or last print scan may be less than the amount of ink applied to the unit region by the other 2N−1 print scans succeeding the first print scan or preceding the last print scan. Then, a mask pattern may be used in which, out of those 2N−1 print scans, the print permission rate is set lower for a divided region corresponding to an even-numbered print scan than for a divided region corresponding to an odd-numbered print scan. In other words, print scans are performed on a unit region in accordance with the above-described control for multi-pass printing with an odd number of passes (2N−1), and then before or after those consecutive (2N−1) print scans, a print scan may be performed at a print permission rate lower than their print permission rates. As a result, the number of the printing stages which are partitioned by the elapsing time TL and with which a majority of the ink is applied and the ratio between the amounts of ink applied in the printing stages can be maintained substantially the same between unit regions, and thus, time difference unevenness can be mitigated.

Note that the embodiments and modifications described above can be combined with each other. For example, the three-pass bidirectional printing described in the first embodiment may be performed for printing plain paper, and the five-pass bidirectional printing described in the second embodiment may be performed for printing coated paper. Also, a mode is possible that employs the first embodiment, yet uses the mask pattern of Modification 3 shown in FIG. 15A for black ink and the mask shown in FIG. 14 for color ink.

Also, the above embodiments are described on the assumption that color order unevenness caused due to the difference in the order of ink application, which is a challenge that color inkjet printing apparatuses often face, is to be reduced by use of a symmetrical head described using FIG. 2. However, using a symmetrical head is not essential in the above embodiments. For example, in a monochrome inkjet printing apparatus that uses only black ink or an inkjet printing apparatus having nozzle rows of respective colors arranged in the conveyance direction (the Y-direction), bidirectional printing does not cause color order unevenness. However, even in a case of such inkjet printing apparatuses, time difference unevenness does occur in multi-pass bidirectional printing. In other words, time difference unevenness occurs in a case where a serial inkjet printing apparatus performs bidirectional multi-pass printing, and by use of the mask patterns described in the above embodiments, time difference unevenness can be reduced to improve image quality.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can print a high-quality image with reduced time difference unevenness in bidirectional multi-pass printing with three or more passes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-217095, filed Dec. 25, 2020, which is hereby incorporated by reference wherein in its entirety.

What is claimed is:

1. A printing apparatus comprising:
   a print head in which a plurality of nozzles for ejecting ink are arranged in a predetermined direction;
   a scan unit configured to perform print scans by moving the print head relative to a printing medium alternately in a forward direction and a backward direction which intersect with the predetermined direction;
   a conveyance unit configured to convey the printing medium in a direction intersecting with the print scans; and
   a control unit configured to control the print head, the scan unit, and the conveyance unit to print an image in accordance with image data onto the printing medium,
   wherein the control unit performs control such that
      an image in a unit region on the printing medium is printed by 2N+1 times of the print scans, where N is a natural number,
      a print permission rate for an even-numbered print scan of the 2N+1 times of the print scans is lower than a print permission rate for an odd-numbered print scan of the 2N+1 times of the print scans, and
      the print permission rate is equal among the odd-numbered print scans of the 2N+1 times of the print scans.

2. The printing apparatus according to claim 1, wherein the control unit performs control such that the print permission rate for a last print scan of the 2N+1 times of the print scans is higher than the print permission rate for a first print scan of the 2N+1 times of the print scans.

3. The printing apparatus according to claim 1, wherein the control unit performs control such that
in the odd-numbered print scan of the 2N+1 times of the print scans, the print permission rate is higher at a center portion of the unit region in the predetermined direction than at edge portions of the unit region in the predetermined direction, and
in the even-numbered print scan of the 2N+1 times of the print scans, the print permission rate is lower at the center portion of the unit region in the predetermined direction than at the edge portions of the unit region in the predetermined direction.

4. The printing apparatus according to claim 3, wherein the control unit performs control such that
in the odd-numbered print scan of the 2N+1 times of the print scans, the print permission rate increases from the center portion to the edge portions of the unit region in the predetermined direction, and
in the even-numbered print scan of the 2N+1 times of the print scans, the print permission rate decreases from the center portion to the edge portions of the unit region in the predetermined direction.

5. The printing apparatus according to claim 1, wherein the N is 1 or 2.

6. The printing apparatus according to claim 1, wherein the control unit controls the print permission rate for each of 2N+1 divided regions obtained by division of the plurality of nozzles in the predetermined direction, in accordance with a mask pattern defining, for each of pixel regions on the printing medium, whether a dot is permitted or not permitted to be printed on the pixel region.

7. A printing method comprising:
performing print scans by moving a print head in which a plurality of nozzles for ejecting ink are arranged in a predetermined direction relative to a printing medium alternately in a forward direction and a backward direction which intersect with the predetermined direction; and
conveying the printing medium in a direction intersecting with the print scans,
wherein an image in a unit region on the printing medium is printed by 2N+1 times of the print scans, where N is a natural number, each in accordance with a predefined print permission rate,
wherein the print permission rate for an even-numbered print scan of the 2N+1 times of the print scans is lower than the print permission rate for an odd-numbered print scan of the 2N+1 times of the print scans, and
wherein the print permission rate is equal among the odd-numbered print scans of the 2N+1 times of the print scans.

8. The printing method according to claim 7, wherein the print permission rate for a last print scan of the 2N+1 times of the print scans is higher than the print permission rate for a first print scan of the 2N+1 times of the print scans.

9. The printing method according to claim 7, wherein in the odd-numbered printing scan of the 2N+1 times of the print scans, the print permission rate is higher at a center portion of the unit region in the predetermined direction than at edge portions of the unit region in the predetermined direction, and
in the even-numbered printing scan of the 2N+1 times of the print scans, the print permission rate is lower at the center portion of the unit region in the predetermined direction than at the edge portions of the unit region in the predetermined direction.

10. The printing method according to claim 9, wherein in the odd-numbered print scan of the 2N+1 times of the print scans, the print permission rate increases from the center portion to the edge portions of the unit region in the predetermined direction, and
in the even-numbered print scan of the 2N+1 times of the print scans, the print permission rate decreases from the center portion to the edge portions of the unit region in the predetermined direction.

11. The printing method according to claim 7, wherein the N is 1 or 2.

12. The printing method according to claim 7, wherein the print permission rate is set for each of 2N+1 divided regions obtained by division of the plurality of nozzles in the predetermined direction, by a mask pattern defining, for each of pixel regions on the printing medium, whether a dot is permitted or not permitted to be printed on the pixel region.

13. A printing apparatus comprising:
a print head in which a plurality of nozzles for ejecting ink are arranged in a predetermined direction;
a scan unit configured to perform print scans by moving the print head relative to a printing medium alternately in a forward direction and a backward direction which intersect with the predetermined direction;
a conveyance unit configured to convey the printing medium in a direction intersecting with the print scans; and
a control unit configured to control the print head, the scan unit, and the conveyance unit to print an image in accordance with image data onto the printing medium,
wherein the control unit performs control such that
an image in a unit region on the printing medium is printed by 2N+1 times of the print scans, where N is a natural number,
a print permission rate for an even-numbered print scan of the 2N+1 times of the print scans is lower than a print permission rate for an odd-numbered print scan of the 2N+1 times of the print scans, and
the print permission rate is equal among the even-numbered print scans of the 2N+1 times of the print scans.

14. A printing apparatus comprising:
a print head in which a plurality of nozzles for ejecting ink are arranged in a predetermined direction;
a scan unit configured to perform print scans by moving the print head relative to a printing medium alternately in a forward direction and a backward direction which intersect with the predetermined direction;
a conveyance unit configured to convey the printing medium in a direction intersecting with the print scans; and
a control unit configured to control the print head, the scan unit, and the conveyance unit to print an image in accordance with image data onto the printing medium,
wherein the control unit performs control such that
an image in a unit region on the printing medium is printed by 2N+1 times of the print scans, where N is a natural number,
a print permission rate for an even-numbered print scan of the 2N+1 times of the print scans is lower than a print permission rate for an odd-numbered print scan of the 2N+1 times of the print scans, and
a print scan, the print permission rate for which is lower than the print permission rates for the 2N+1 times of the print scans, is performed on the unit region preceding or succeeding the 2N+1 times of the print scans.

15. A printing apparatus comprising:
a print head in which a plurality of nozzles for ejecting ink are arranged in a predetermined direction;
a scan unit configured to perform print scans by moving the print head relative to a printing medium alternately in a forward direction and a backward direction which intersect with the predetermined direction;
a conveyance unit configured to convey the printing medium in a direction intersecting with the print scans; and
a control unit configured to control the print head, the scan unit, and the conveyance unit to print an image in accordance with image data onto the printing medium,
wherein the control unit performs control such that
an image in a unit region on the printing medium is printed by 2N+1 times of the print scans, where N is a natural number, and
a print permission rate for an even-numbered print scan of the 2N+1 times of the print scans is lower than a print permission rate for an odd-numbered print scan of the 2N+1 times of the print scans,
wherein the print head has a nozzle row in which a plurality of nozzles for ejecting a black ink are arranged in the predetermined direction and a nozzle row in which a plurality of nozzles for ejecting a color ink are arranged in the predetermined direction,
wherein the print permission rates for the respective 2N+1 times of the print scans are different between the black ink and the color ink,
wherein the print permission rate for the even-numbered print scan for the unit region for the black ink is higher than the print permission rate for the even-numbered print scan for the unit region for the color ink, and
wherein the control unit further performs control such that, for the black ink, the print permission rate is equal among the 2N+1 times of the print scans for the unit region.

16. A printing method comprising:
performing print scans by moving a print head in which a plurality of nozzles for ejecting ink are arranged in a predetermined direction relative to a printing medium alternately in a forward direction and a backward direction which intersect with the predetermined direction; and
conveying the printing medium in a direction intersecting with the print scans,
wherein an image in a unit region on the printing medium is printed by 2N+1 times of the print scans, where N is a natural number, each in accordance with a predefined print permission rate,
wherein the print permission rate for an even-numbered print scan of the 2N+1 times of the print scans is lower than the print permission rate for an odd-numbered print scan of the 2N+1 times of the print scans, and
wherein the print permission rate is equal among the even-numbered print scans of the 2N+1 times of the print scans.

17. A printing method comprising:
performing print scans by moving a print head in which a plurality of nozzles for ejecting ink are arranged in a predetermined direction relative to a printing medium alternately in a forward direction and a backward direction which intersect with the predetermined direction; and
conveying the printing medium in a direction intersecting with the print scans,
wherein an image in a unit region on the printing medium is printed by 2N+1 times of the print scans, where N is a natural number, each in accordance with a predefined print permission rate,
wherein the print permission rate for an even-numbered print scan of the 2N+1 times of the print scans is lower than the print permission rate for an odd-numbered print scan of the 2N+1 times of the print scans, and
wherein a print scan, the print permission rate for which is lower than the print permission rates for the 2N+1 times of the print scans, is additionally performed on the unit region preceding or succeeding the 2N+1 times of the print scans.

18. A printing method comprising:
performing print scans by moving a print head in which a plurality of nozzles for ejecting ink are arranged in a predetermined direction relative to a printing medium alternately in a forward direction and a backward direction which intersect with the predetermined direction; and
conveying the printing medium in a direction intersecting with the print scans,
wherein an image in a unit region on the printing medium is printed by 2N+1 times of the print scans, where N is a natural number, each in accordance with a predefined print permission rate,
wherein the print permission rate for an even-numbered print scan of the 2N+1 times of the print scans is lower than the print permission rate for an odd-numbered print scan of the 2N+1 times of the print scans,
wherein the print head has a nozzle row in which a plurality of nozzles for ejecting a black ink are arranged in the predetermined direction and a nozzle row in which a plurality of nozzles for ejecting a color ink are arranged in the predetermined direction,
wherein the print permission rates for the respective 2N+1 times of the print scans are different between the black ink and the color ink,
wherein the print permission rate for the even-numbered print scan for the unit region for the black ink is higher than the print permission rate for the even-numbered print scan for the unit region for the color ink, and
for the black ink, the print permission rate is equal among the 2N+1 times of the print scans for the unit region.

19. A printing apparatus comprising:
a print head in which a plurality of nozzles for ejecting ink are arranged in a predetermined direction;
a scan unit configured to perform print scans by moving the print head relative to a printing medium alternately in a forward direction and a backward direction which intersect with the predetermined direction;
a conveyance unit configured to convey the printing medium in a direction intersecting with the print scans; and
a control unit configured to control the print head, the scan unit, and the conveyance unit to print an image in accordance with image data onto the printing medium,
wherein the control unit performs control such that
an image in a unit region on the printing medium is printed by three times of the print scans, and
a print permission rate for the second print scan to the unit region is lower than a print permission rate for the first print scan to the unit region, and the print permission rate for the second print scan to the unit region is lower than a print permission rate for the third print scan to the unit region.

20. The printing apparatus according to claim 19, wherein the printing medium is a plain paper.

21. The printing apparatus according to claim 19, wherein the print permission rate is a rate of pixel regions permitted for printing in reference to the pixel regions printable with a single print scan.

22. The printing apparatus according to claim 19, wherein the print permission rate of the first print scan is substantially the same as the print permission rate of the third print scan.

23. The printing apparatus according to claim 19, wherein the first print scan and the third print scan are scans in a first direction and the second print scan is a scan in an opposite direction to the first direction.

24. The printing apparatus according to claim 19, wherein the first print scan and the third print scan for a first unit region are the forward scans and the second print scan for the first unit region is the backward scan, and wherein the first print scan and the third print scan for a second unit region adjacent to the first unit region are the backward scans and the second print scan for the second unit region is the forward scan.

25. The printing apparatus according to claim 19, wherein in a case where a sum of the print permission rates of the three times of the print scans is 100%, a difference between the print permission rate of the second print scan and the print permission rate of the first print scan is equal to or larger than 14%.

* * * * *